US011755340B2

(12) United States Patent
Chhabra et al.

(10) Patent No.: US 11,755,340 B2
(45) Date of Patent: Sep. 12, 2023

(54) AUTOMATIC ENROLLMENT AND INTELLIGENT ASSIGNMENT OF SETTINGS

(71) Applicant: MICROSOFT TECHNOLOGY LICENSING, LLC, Redmond, WA (US)

(72) Inventors: Shalendra Chhabra, Seattle, WA (US); Jason Thomas Faulkner, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 333 days.

(21) Appl. No.: 17/065,495

(22) Filed: Oct. 7, 2020

(65) Prior Publication Data

US 2022/0107816 A1   Apr. 7, 2022

(51) Int. Cl.
*G06F 9/445* (2018.01)
*G06N 20/00* (2019.01)
*G06F 9/54* (2006.01)

(52) U.S. Cl.
CPC .............. *G06F 9/4451* (2013.01); *G06F 9/54* (2013.01); *G06N 20/00* (2019.01)

(58) Field of Classification Search
CPC ......... G06F 9/4451; G06F 9/54; G06N 20/00; H04M 2250/62
USPC .......................................................... 713/1
See application file for complete search history.

(56) References Cited

U.S. PATENT DOCUMENTS

| | | | |
|---|---|---|---|
| 5,805,153 A | 9/1998 | Nielsen | |
| 5,857,189 A * | 1/1999 | Riddle | G06Q 10/10 |
| 6,275,602 B1 | 8/2001 | Concannon et al. | |
| 6,820,055 B2 | 11/2004 | Saindon et al. | |
| 7,085,364 B1 * | 8/2006 | Ahmed | H04M 3/56 |
| | | | 379/202.01 |
| 7,383,303 B1 * | 6/2008 | Bort | H04L 51/212 |
| | | | 709/219 |
| 7,554,522 B2 | 6/2009 | Sinclair et al. | |
| 8,386,255 B2 | 2/2013 | Michaelis | |
| 8,769,006 B2 | 7/2014 | Davidson et al. | |
| 8,830,295 B2 | 9/2014 | Vivekanandan et al. | |
| 8,861,701 B2 | 10/2014 | Abuan et al. | |
| 9,131,280 B2 | 9/2015 | Xiong et al. | |
| 9,245,254 B2 | 1/2016 | Lord et al. | |

(Continued)

FOREIGN PATENT DOCUMENTS

WO    2013181025 A2    12/2013

OTHER PUBLICATIONS

"Change Font Size in Webex Teams for iPhone and iPad", Retrieved from: https://help.webex.com/en-us/i36x9c/Change-Font-Size-in-Webex-Teams-for-iPhone-and-iPad, Aug. 14, 2019, 2 Pages.

(Continued)

*Primary Examiner* — Paul R. Myers
(74) *Attorney, Agent, or Firm* — Newport IP, LLC; Han K. Gim

(57) ABSTRACT

The techniques disclosed herein improve existing systems by providing a system that receives a settings profile associated with a first application. The settings profile is stored. When it is determined that a second application has unconfigured settings, the stored settings profile is accessed and based on the stored settings profile, the unconfigured settings are automatically configured.

20 Claims, 19 Drawing Sheets

(56) References Cited

U.S. PATENT DOCUMENTS

| | | | | |
|---|---|---|---|---|
| 10,142,459 | B2 | 11/2018 | Wohlert et al. | |
| 10,573,312 | B1 | 2/2020 | Thomson et al. | |
| 2002/0023134 | A1 | 2/2002 | Roskowski et al. | |
| 2002/0136382 | A1* | 9/2002 | Cohen | H04M 3/56 379/202.01 |
| 2003/0105820 | A1* | 6/2003 | Haims | G06Q 10/10 709/227 |
| 2003/0170006 | A1* | 9/2003 | Bogda | G11B 27/34 386/E5.064 |
| 2004/0153510 | A1* | 8/2004 | Riddle | H04L 65/1101 709/224 |
| 2004/0162058 | A1* | 8/2004 | Mottes | H04M 15/765 455/411 |
| 2005/0210114 | A1* | 9/2005 | Washburn | H04L 51/58 709/227 |
| 2008/0043274 | A1* | 2/2008 | Wang | G06F 21/608 358/1.14 |
| 2008/0068446 | A1* | 3/2008 | Barkley | H04N 19/187 348/14.07 |
| 2009/0077191 | A1* | 3/2009 | Bristow | H04L 51/56 709/207 |
| 2010/0241432 | A1 | 9/2010 | Michaelis | |
| 2011/0103568 | A1* | 5/2011 | Gartner | H04M 3/565 379/202.01 |
| 2011/0228922 | A1* | 9/2011 | Dhara | H04L 47/70 379/202.01 |
| 2012/0287228 | A1* | 11/2012 | Mishra | H04M 3/567 348/14.09 |
| 2012/0296658 | A1* | 11/2012 | Smyth | G10L 19/22 704/500 |
| 2012/0324135 | A1* | 12/2012 | Goodman | G06F 1/1632 710/304 |
| 2013/0018950 | A1 | 1/2013 | Narayanan et al. | |
| 2013/0346569 | A1* | 12/2013 | Smith | H04L 41/0803 709/220 |
| 2014/0229848 | A1* | 8/2014 | Zhang | G06F 3/0484 715/745 |
| 2015/0195410 | A1 | 7/2015 | De Castro et al. | |
| 2016/0277518 | A1 | 9/2016 | Grant et al. | |
| 2017/0006162 | A1* | 1/2017 | Bargetzi | G06Q 10/109 |
| 2017/0116579 | A1 | 4/2017 | Emejulu et al. | |
| 2017/0329861 | A1* | 11/2017 | Bhatia | G06F 16/258 |
| 2019/0141292 | A1* | 5/2019 | Thakkar | H04L 12/1818 |
| 2019/0347181 | A1* | 11/2019 | Cranfill | G06F 21/629 |
| 2020/0112450 | A1 | 4/2020 | Chhabra et al. | |

OTHER PUBLICATIONS

"Change your Language on Zoom", Retrieved from: https://web.archive.org/web/20191116103018/https:/support.zoom.us/hc/en-us/articles/209982306-Change-your-language-on-Zoom, Nov. 16, 2019, 4 Pages.

"Languages Supported in Microsoft Teams for Education", Retrieved from: https://support.microsoft.com/en-ie/office/languages-supported-in-microsoft-teams-for-education-293792c3-352e-4b24-9fc2-4c28b5de2db8?ui=en-us&rs=en-ie&ad=ie, Retrieved Date: Apr. 14, 2020, 6 Pages.

"Localization of StarLeaf Endpoints, Apps, and Portal", Retrieved from: https://support.starleaf.com/managing/starleaf-admin-portal/localization-of-starleaf-endpoints-apps-and-portal/, Retrieved Date: Apr. 24, 2020, 8 Pages.

"MassMeet: Web Conference Solution", Retrieved from: https://web.archive.org/web/20200315204058/https:/www.elisiontec.com/web-conference-software/, Mar. 15, 2020, 8 Pages.

"Relay Conference Captioning (RCC)", Retrieved from: https://relaysd.com/relay-conference-captioning-rcc, Retrieved Date: May 5, 2020, 7 Pages.

"Watch Videos with Subtitles and Captions on iphone", Retrieved from: https://support.apple.com/en-in/guide/iphone/ph3e2e23d1/ios, Jul. 11, 2018, 2 Pages.

"Welcome to the Microsoft Teams UserVoice!", Retrieved from: https://microsoftteams.uservoice.com/forums/555103-public/suggestions/34931146-option-to-change-global-font-size-in-teams-apply, Retrieved Date: Apr. 14, 2020, 6 Pages.

"What Accessibility Features are Available for Skype?", Retrieved from: https://web.archive.org/web/20150426080936/https:/support.skype.com/en/faq/FA12371/what-accessibility-features-are-available-for-skype, Apr. 26, 2015, 7 Pages.

"Zoom: Captioning & Recording", Retrieved from: https://clt.odu.edu/keep-teaching/assets/pdf/zoom-captioning-and-recording.pdf, Retrieved Date: May 5, 2020, 25 Pages.

Kushalnagar, et al., "SubtitleFormatter: Making Subtitles Easier to Read for Deaf and Hard of Hearing Viewers on Personal Devices", In International Conference on Computers Helping People with Special Needs, Jul. 11, 2018, pp. 211-218.

Sodiq, Olanrewaju, "How to Turn on and Customize Captions for Videos on Android", Retrieved from: https://www.guidingtech.com/turn-on-captions-android-smartphone/, Oct. 21, 2019, 13 Pages.

"International Search Report and Written Opinion Issued in PCT Application No. PCT/US21/039330", dated Oct. 22, 2021, 11 Pages.

* cited by examiner

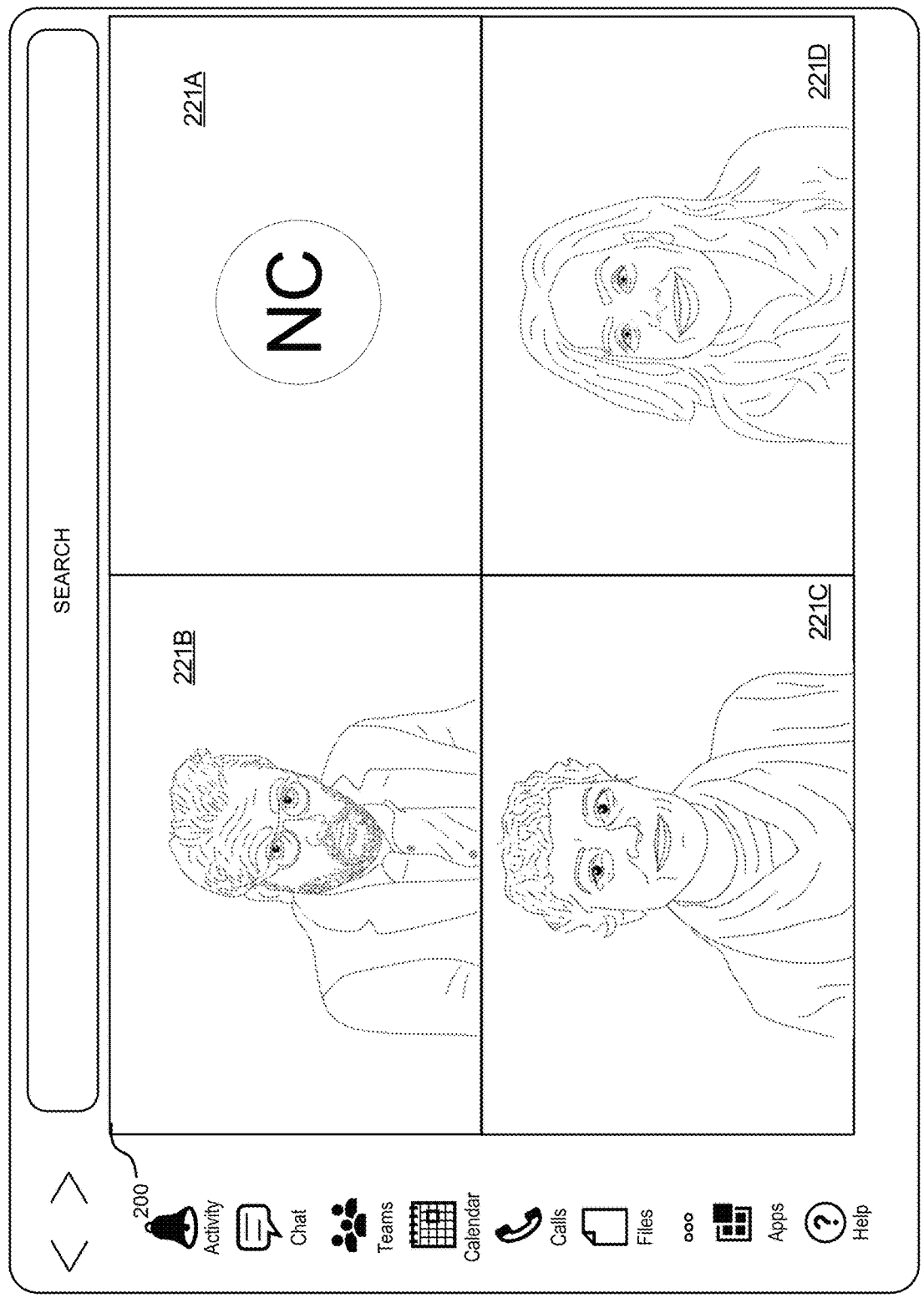

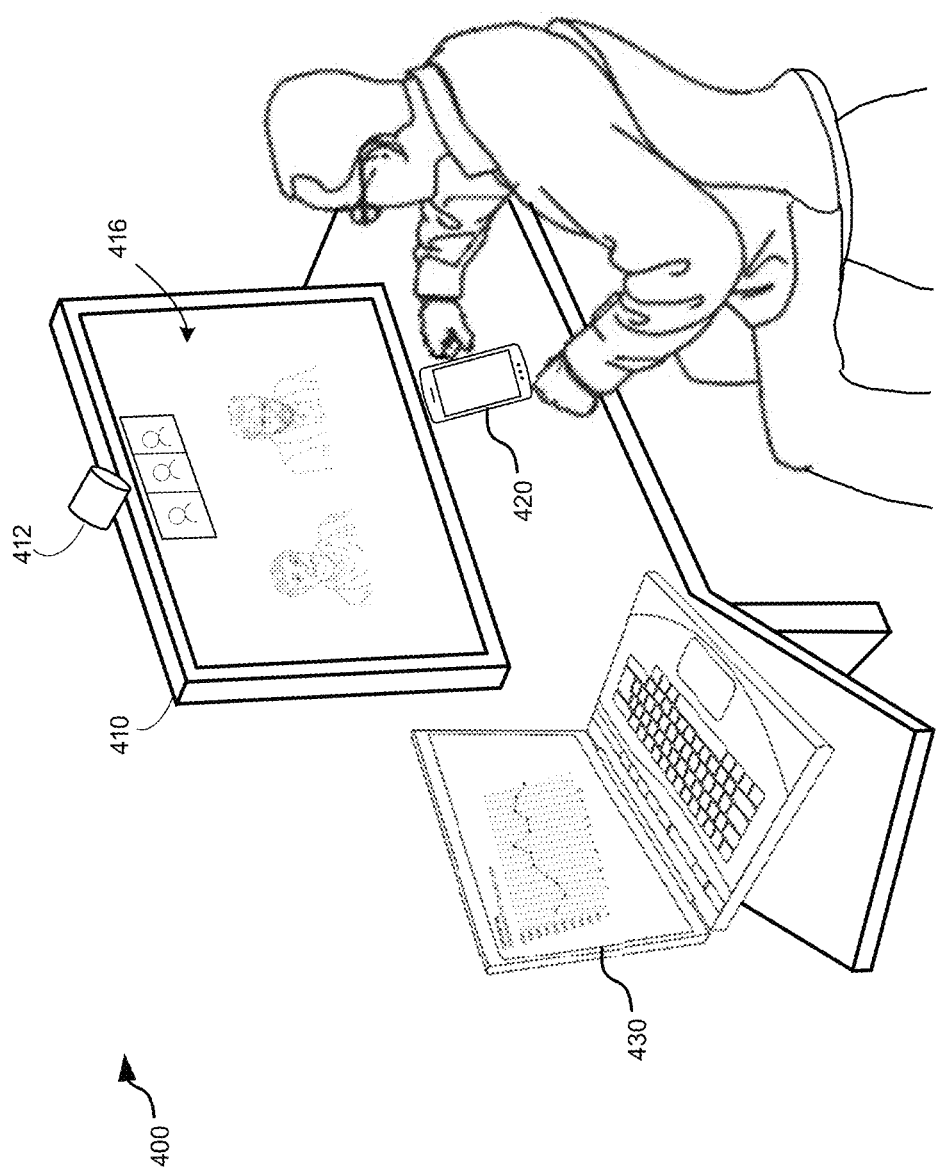

| ID | Description (text) | Categories | User (person) | Modified (timedate) | Weight |
|---|---|---|---|---|---|
| 1273893 | Teams Captioning ON | 1, 3 | Bob Smith | 15/9/2018 18:31 | 3 |
| 1273894 | Captioning Font Arial Bold Size 18 | 1, 3, 4 | Bob Smith | 15/9/2018 18:32 | 2 |
| 1273894 | Audio Turn OFF | 1, 2, 3 | Bob Smith | 15/9/2018 18:33 | 1 |

AUTOMATIC ENROLLMENT AND INTELLIGENT ASSIGNMENT OF SETTINGS

BACKGROUND

There are a number of systems and applications that provide features that assist users with communications features on their devices. For example, some systems allow users to communicate and collaborate using live video streams, live audio streams, and other forms of real-time, text-based, or image-based applications. Some systems also allow users to share files during a communication session. Furthermore, some systems provide users with tools for editing content of shared files.

Although there are a number of different types of systems and applications that assist users to communicate and interact, users may not always benefit from such features. For example, if a user does not select options to invoke the features, or an application does not have the user's preferences, then the features may not be activated when needed.

Systems that do not readily enable such users to activate such features can cause a host of issues and negatively impact the effectiveness and accessibility of a communication system in such scenarios. Computing devices that do not facilitate the use of features can lead to production loss and inefficiencies with respect to a number computing resources. For instance, participants of a communication session, such as an online meeting, may need to refer to recordings or other resources when live content is missed or overlooked. Content may need to be re-sent when participants miss salient points or cues during a live meeting. Participants may also have to re-watch content when they miss salient points or cues during a viewing of a recorded presentation. Such activities can lead to inefficient use a network, processor, memory, or other computing resources. Also, when a participant's level of engagement is negatively impacted during a meeting, such a loss of production may cause a need for prolonged meetings or follow-up meetings, which in turn take additional computing resources. Such inefficiencies can be exacerbated when a system is used to provide a collaborative environment for a large number of participants.

In addition to a loss in user engagement, a number of resource inefficiencies can result when communication systems do not effectively enable the use of features that assist users to communicate with the systems. Participants can miss important cues which can sometimes require the participants to manually interact with a number of different systems. For example, participants who miss important cues may start to utilize additional computing resources to communicate using text messages, emails, or other forms of communication. Such manual steps can be disruptive to a user's workflow and highly inefficient when it comes to helping a user establish a collaboration protocol with a group of participants. Such drawbacks of existing systems can lead to loss of productivity as well as inefficient use of computing resources.

SUMMARY

The techniques disclosed herein provide users with a way to select and combine various settings and make them accessible to various first party to third party applications, and further to make them portable across systems and devices. In various embodiments, a system that implements such techniques may be configured to obtain user setting information across various operating system (OS) settings, devices, profiles, regions/locations, etc. and automatically adapt and integrate the information for incorporation into various applications such as online meeting experiences. For example, if a user specifies certain font settings for user captioning or braille reader settings at the OS level (or other speech-to-text settings), then the system may automatically inform the user's active meeting settings of those contextual changes for any current meeting or interaction experiences. The system may also pass the same settings information to third party applications such as YouTube and first party application experiences such as Stream. The techniques described herein may be used in the context of various types of settings for system features that facilitate communications between a user and a computing device via various interfaces. Such settings typically involve visual interfaces such as those rendered on a graphical user interface, audio interfaces such as an audio speaker, and tactile interfaces such as a vibration device. In some examples, the techniques may be applied to a subset of settings that pertain to a particular grouping or classification of settings. In example of a subset may be accessibility settings that facilitate communications with users who have one or more impairments and who may benefit from features such as speech-to-text captioning. Such accessibility settings may also be referred to as impairment settings or inclusivity settings. The described techniques may be implemented to settings generally, or to a subset of settings as described. By applying the described techniques to a specified subset of settings, the system can provide more flexible options to the user for storing, sharing, and applying various groupings of settings to the user's devices and systems.

During the lifecycle of a collaborative session, the user may select, edit and save settings preferences as a signal or response to the system. Any edits or changes by the user may be fed back to the system for analysis of the edits or changes and updating of the user's settings profile. In some embodiments, a machine learning engine may be used to learn the user's settings.

In some embodiments, a standard interface may be defined and implemented for obtaining, storing, and sharing settings between the system and first, second, and third party applications, as well as remote systems and devices.

In some embodiments, user settings may be communicated to the system via responses (e.g., RSVP) to invitations to meetings or other prompts for responses to collaborative sessions. When the collaborative session begins, the system may automatically read or otherwise access the settings and integrate the settings with the collaborative session application.

In one embodiment, the user settings may be learned using code embedded in a meeting invitation that may be used to facilitate online meetings using a collaboration platform. In one example, an ad hoc meeting invitation that is not application-based on the user device may be received. The user device may not have specific information as to the settings for originating applications. The meeting invitation may be embedded with scripts or code for collecting settings from the user device, such as whether the user is vision impaired, or hearing impaired, if the user would like to use a braille reader, language settings, font settings, translation settings, and the like. In an embodiment, the scripts or code, when executed, may implement functionality to request, access, and/or collect settings. The collected settings may be sent to the sending device/server via the sending device/server's RSVP process, and/or during the meeting join time. At the meeting time, the sending device/server may automatically apply the collected settings in configuring and rendering content to the user device at meeting time.

The techniques described above can lead to more efficient use of computing resources. In particular, by automating a process for collecting and sharing settings, user interaction with the computing device can be improved. The techniques disclosed herein can lead to a more efficient use of computing resources by eliminating the need for a person to perform a number of manual steps to repeatedly search, discover, review, display, and select various settings, which may be different for each application and system. The reduction of manual processes and the reduction of a need for manual entry can lead to fewer inadvertent inputs and errors. This can ultimately lead to more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures.

References made to individual items of a plurality of items can use a reference number with a letter of a sequence of letters to refer to each individual item. Generic references to the items may use the specific reference number without the sequence of letters. The same reference numbers in different figures indicate similar or identical items.

FIG. 2A illustrates an example user interface in accordance with an embodiment.

FIG. 4 illustrates an example user environment in accordance with an embodiment.

FIG. 5 illustrates in example of a table storing settings.

DETAILED DESCRIPTION

Figure 1:
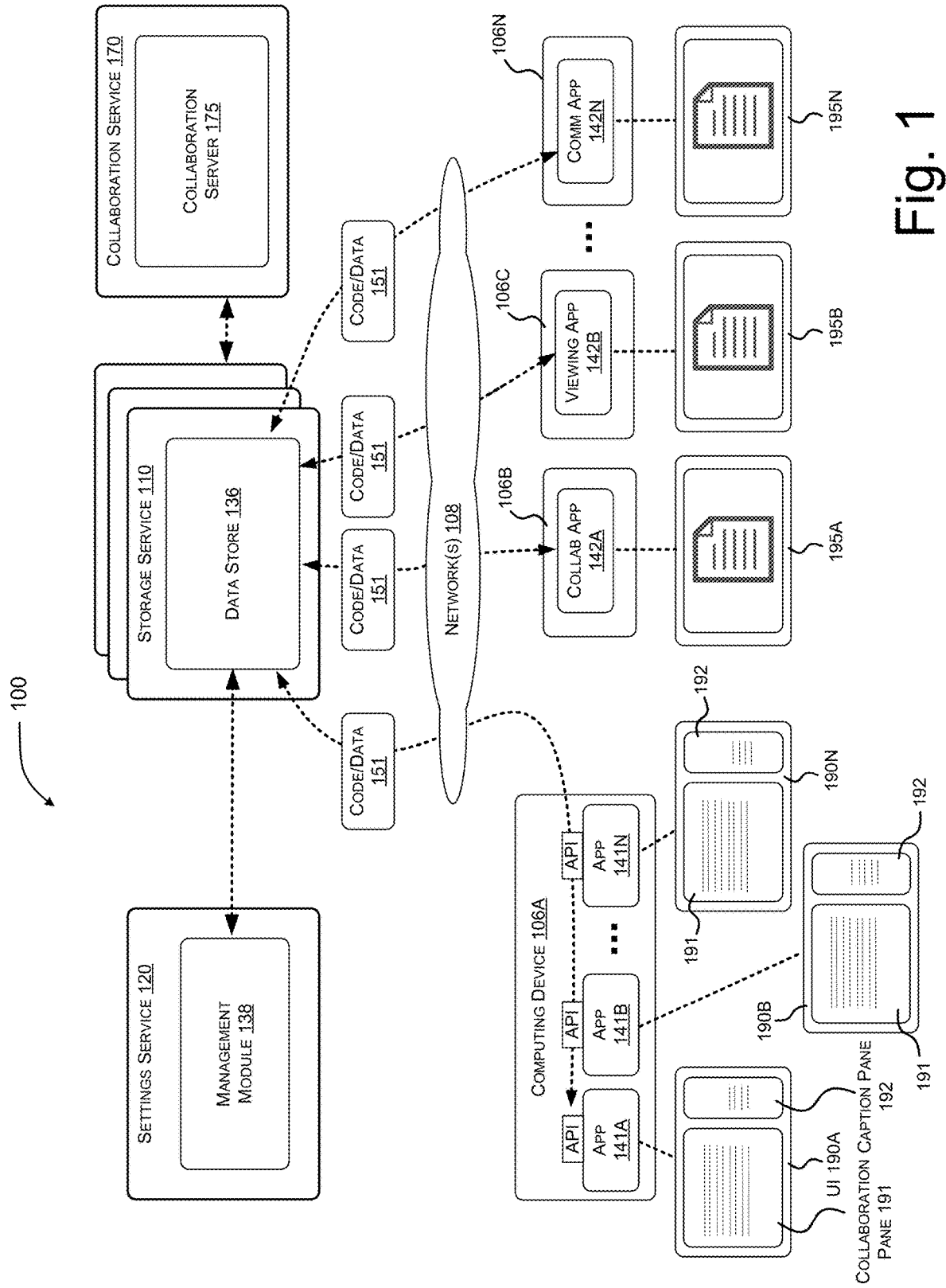
FIG. 1 illustrates aspects of a system for managing settings.

The techniques disclosed herein provide systems with a way to efficiently access and combine various settings that may be used to configure functions and applications on a computing system and make them portable across first party to third party applications. Technical problems encountered when configuring settings include a lack of standardization between system and applications, which can result in multiple versions of settings information having to be entered, stored, and processed. Lack of standardization can further lead to systems and applications being inconsistently configured which can create conflicts when running various features and applications. Furthermore, lack of a consistent and standardized process for inputting and processing settings may result in users having to repeatedly interrupt processes in order to enter and communicate settings information, thereby consuming additional computing, storage, and network resources. The technical problems solved by the techniques described herein include lack of or inefficient computing for receiving, applying, and maintaining settings for communications applications. Technical effects achieved include improvements over conventional systems for obtaining and applying settings by reducing the amount of code executed by computing systems in order to request or access user settings and to execute processes for generating interfaces that prompt for user inputs. Technical effects further include reducing the amount of storage used by computing systems to store user settings information for multiple applications and functions. As a result, such systems and methods can significantly reduce memory utilization when managing settings for a user.

Systems and methods consistent with the present disclosure achieve the benefits noted above by implementing a system configured to obtain setting information across various operating system (OS) settings, devices, user settings, profiles, regions/locations, etc. and automatically adapt and integrate the information for incorporation into online meeting experiences. For example, if a user specifies certain font settings for user captioning or braille reader settings at the OS level (or other speech-to-text settings), then the system may automatically inform the user's active meeting settings of those contextual changes for any current meeting or interaction experiences. The system may also pass the same settings information to third party applications such as YouTube and first party application experiences such as Stream.

In some embodiments, user settings may be communicated to the system during RSVP or other response to meeting invitations. At the meeting time, the system may automatically read the setting signals and integrate the settings with the active reading software.

During the meeting lifecycle, the user may select, edit and save preferences as a signal or response to the system. Any edits or changes by the user may be fed back to the system for analysis of the edits or changes. For example, a machine learning engine may be used to learn the user's settings.

In some embodiments, a standard interface may be defined for obtaining, storing, and sharing settings between the system and first, second, and third party applications, as well as remote systems and devices.

In one embodiment, settings unique to users in a communication session may be adaptively applied. A data processing system may generate an invitation to the communication session. The invitation may include one or more of a time for the communication session, a link to join the session, or embedded machine-executable instructions which, upon execution by a computing device corresponding to a user of the communication session, cause the device to collect settings from the computing device.

The settings may, for example, be usable to configure one or more computer-implemented functions for assisting the user to interact with interfaces of the device during the communication session. Data indicative of the invitation to the communication session may be sent to a computing device of a respective user. The computing device may execute the embedded machine-executable instructions. The execution of the machine-executable instructions may cause the computing device to fetch or otherwise obtain a settings profile of the respective user on the computing device. The settings profile may include settings for one or more functions of one or more applications.

The computing device may generate a response to the invitation. The response may include the settings profile. In one embodiment, the response may be included in an RSVP to the invitation. The RSVP may comprise an indication that the respective user has accepted or rejected the invitation. In some embodiments, the response may be sent when the computing device connects to the communication session.

The one or more functions may be automatically configured in interacting with the data processing system during the communication session by applying the settings profile. In some embodiments, functions for assisting additional users may be automatically configured on additional respective computing devices to interact with the data processing system during the communication session by applying received settings that are unique to the additional users.

In an embodiment, user accessibility settings may be collected over a series of meetings and other activities. The system may collect settings that have been configured by the user over the course of the user's activities. The system may store the settings as a profile associated with the user. Additionally, the system may learn the settings and use the settings to make predictions for the user based on past settings. For example, predicted settings may be used to configure accessibility settings for applications for which the user has not specifically selected settings. In one embodiment, the system may present the proposed settings to the user for confirmation or editing.

In an embodiment, applications that do not have settings for a user may submit a request for the settings. For example, a third-party application may submit a request for the settings to a standard interface such as an API. The third-party application may receive the settings and integrate the settings into its configuration.

Additionally, the system may obtain settings from the third-party application if the settings have been previously provided to the third-party application by the user.

In an embodiment, the settings may be stored as general settings that can be accessed by any first, second, or third party functions and applications. The system may, if permissions are in place, provide the settings to any requesting applications and functions for configuration of their settings.

In an embodiment, the settings may be provided as a general and universal set of preferences that may be applied in whole or in part for any application. In one embodiment, the user may be provided an option to automatically provide the settings as a universal preference. For example, the user may be provided such an option as an initial setting when the system is initially configured.

In an embodiment, the settings may be invoked when a call or meeting or any other application that may use the accessibility settings is executed.

In one embodiment, the settings may be saved and used as a portable set of configurations. For example, the settings for a user may be stored by a service in the cloud and may be provided whenever the user is on a device and has been authenticated. The device may connect to the user's account in the cloud and download the settings.

In some embodiments, the user's settings may be accessed and activated based on identification of the user in new locations. For example, when the user is identified in a meeting room in a work environment, the device being used by the user may obtain the user's settings based on identification of the user and accessing the user's accessibility settings from the cloud.

In some embodiments, multiple settings profiles may be provided for a user.

In one implementation, a bot or agent may be joined to an application instance such as a meeting instance of a collaboration program. The bot or agent may act on behalf of a user, obtaining the user's settings and providing the settings to the application instance. Similarly, the bot or agent may provide the settings to other functions and applications.

In some embodiments, the system may request a number of authorizations from the user, including acceptance of privacy awareness. The user may accept a privacy issue in order to enable the service.

In some embodiments, the settings can be role-based. For example, the settings may be specific to an individual user, and some settings may be applicable to a group of users. In some embodiments, one or more roles may be defined that can be automatically assigned to a user based on one or more characteristics. For example, if a user identifies as being hearing impaired, a role can be automatically assigned to that user. The role can allow the user to be associated with a grouping of settings that are commonly invoked for users who are hearing impaired.

In an example implementation, an entity such as an enterprise can offer a number of predetermined sets of settings for one or more types or roles of users. A particular user may opt in to identify as having a particular type of impairment and/or accept a selected set of settings. Once opted in, the user may automatically be enrolled by one or more enterprise systems. The systems may automatically trigger the settings. The settings may be associated with the user and provided to systems and applications as the user participates in meetings and other activities where the user invokes applications that provide settings. The user's settings may be automatically shared with other services as needed. The settings may be transferred to various applications and systems, such as those in connected meeting rooms, various user devices and services.

In some embodiments, the user's settings can be permanently associated with the user as a profile that is bound to the user and can be made available to a plurality of applications and systems.

In some embodiments, the system can determine, based on the context of the user, that the user should be prompted as to whether settings from the user's settings should be applied to the current context. The determination can be made based on usage and monitoring of the user's selections and other actions. For example, if the user has not previously selected live captions as a permanent setting, but has selected the option in the past three application instances, the user may be prompted as to whether live captions should be saved as a permanent setting.

While many of the described examples are provided in the context of certain settings, the disclosed embodiments may be applied any type of settings and preferences, such as accessibility settings including live captions, screen readers, language translators, and the like. In general, the described techniques may be applied to any type of setting the enables a user to overcome an issue related to participation in the use of device features and features related to various applications and systems.

FIG. 1 illustrates a system 100 for enabling the generation, storage, and updating of settings from multiple applications 141 and doing so while enabling a user to work within a contextual environment of each application 141. In this example, a user can interact with an individual application 141 to launch and participate in applications such as a communications session and edit and add settings that can be used to configure the applications and communications sessions. The applications 141 may each be configured to display a collaboration pane 191 and, in one example, a caption pane 192. Various content pertaining to a collaboration session may be displayed in the collaboration pane 191. In the illustrated example, a user can select an option to receive captions for spoken voice data for the communication session. Other communicative features for facility functionality may be invoked in other examples, Text data for speech-to-text conversion may be presented in caption pane 192. The caption pane 192 of each application 141 may be synchronized to enable a user to receive renderings of text for application 141.

The use of a caption pane 192 is one example implementation, and other types of accessibility settings may be enabled and provided on computing devices 106. The applications 141 may receive and send code/data 151. In some configurations, the code/data 151 can be in the form of text, images, media or any other form of data. In some embodiments, the code/data 151 can include code or script. The code or script can be, for example included with an ad hoc collaboration invitation. The settings service 120 may not have specific information for device settings via applications 141 and can send, for example, a meeting invitation to a computing device 106A. The invitation may be embedded with scripts or control code for collecting accessibility settings from the computing device 106A (e.g., settings for users who are vision impaired, hearing impaired, etc., language settings, braille settings, font settings, translation settings, and the like). The computing device 106 may collect accessibility settings and send the settings to the settings service 120 as part of, for example, an RSVP process in response to the meeting invitation, or during join time of the collaboration session. At the time of the collaboration, the collaboration service 170 may automatically apply the collected settings in configuring and rendering content to the computing device 106 at the session time.

The code/data 151 can include data that is stored within storage service 110 including a data store 136 and managed by management service 120 comprising a management module 138. In some embodiments, code/data 151 can include code or other logic that is integrated into, or linked to, the code/data 151.

The code/data 151 can be communicated to any number of computing devices 106, referred to herein as computing devices 106B-106N, from a first computing device 106A or the service 110 via a network 108. Each computing device 106B-106N associated with a recipient can display the code/data 151 on a user interface 195 (195A-195N) by the use of a viewing application 142. The viewing application 142 can be any suitable application such as a presentation program, a web browser, a media player, etc. The viewing application 142 may also be a web-based application. In one embodiment, the viewing application 142 may be a virtual assistant that uses voice instead of a visual representation to convey data content, e.g., facilitating text-to-speech (TTS). In some embodiments, the viewing application 142 may be an augmented reality, mixed reality, or virtual reality device and the code/data 151 can be rendered within a virtual reality display.

It should be appreciated that the subject matter described herein may be implemented as a computer-controlled apparatus, a computer process, a computing system, or as an article of manufacture such as a computer-readable storage medium. Among many other benefits, the techniques shown herein improve efficiencies with respect to a wide range of computing resources. For instance, human interaction with a device may be improved, as the use of the techniques disclosed herein enable a user with certain impairments to view and interact with data in a wide range of communications and collaborative scenarios while operating a computing device. In addition, improved human interaction improves other computing resources such as processor and network resources, e.g., users can work from a reduced number of applications and reduce a user's computer interaction, reduce the chances of an inadvertent input, reduce network traffic, and reduce computational cycles. The techniques disclosed herein reduce the need to pause applications, reconfigure settings, incorporate updates for, and toggle between, a number of applications, including a specialized presentation program. Other technical effects other than those mentioned herein can also be realized from implementations of the technologies disclosed herein.

Figure 2B:
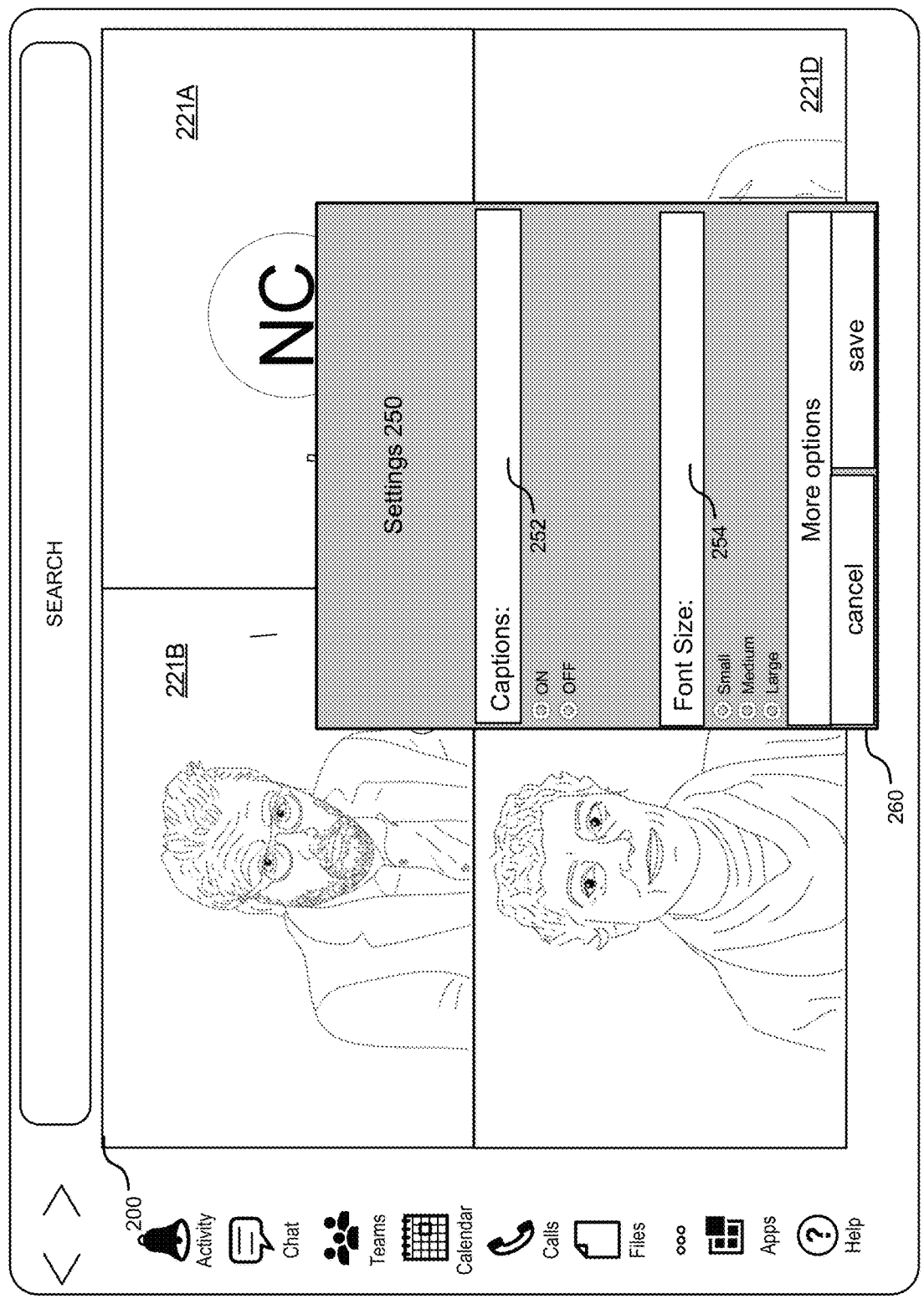
FIG. 2B illustrates an example user interface in accordance with an embodiment.
Figure 2C:
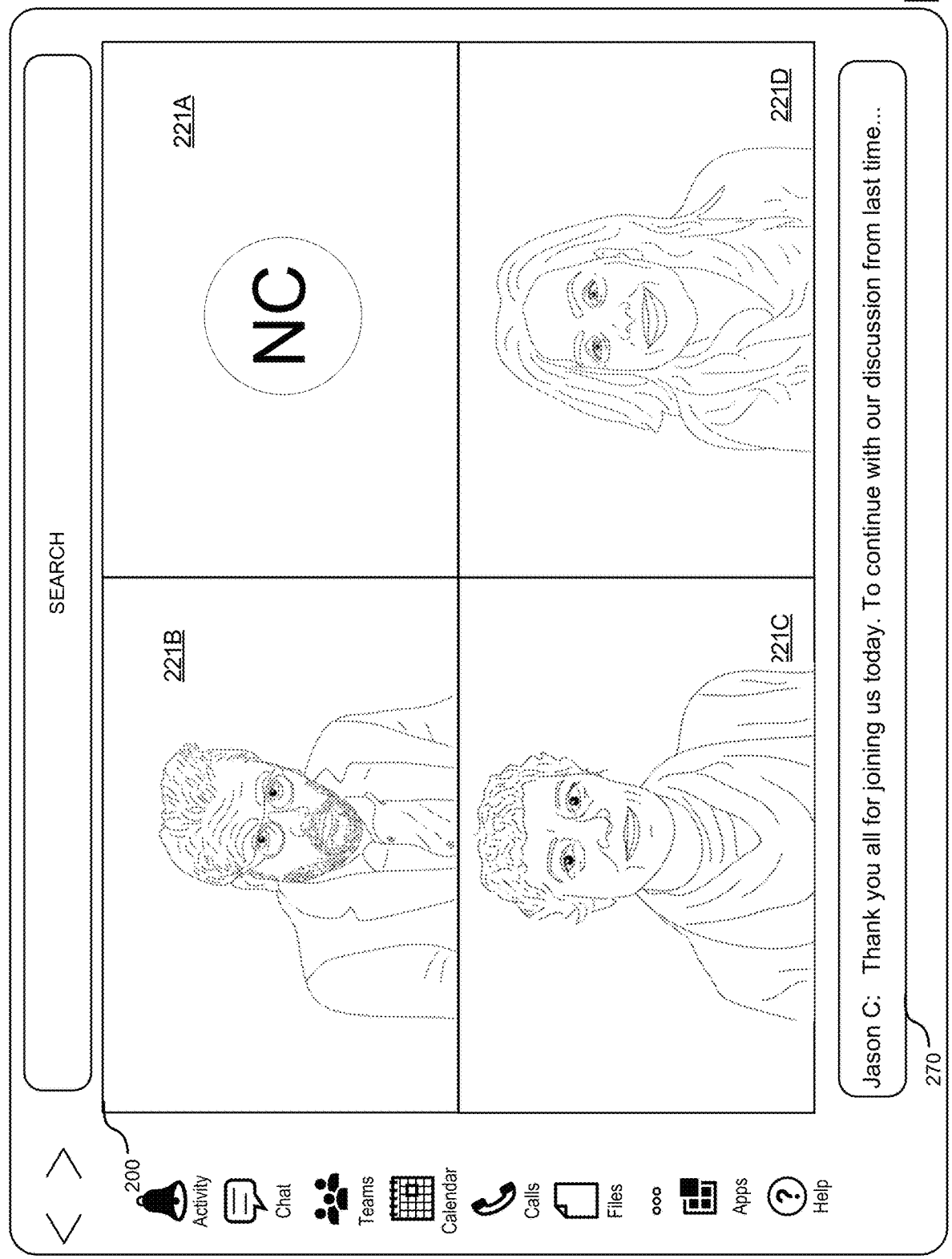
FIG. 2C illustrates an example user interface in accordance with an embodiment.

Turning to FIG. 2A, illustrated is an example user interface 200 showing a collaborative session including four participants 221A, 221B, 221C, and 221D. The collaborative session may default to standard audio settings and may not include, initially, features for users with hearing impairments. FIG. 2B illustrates generation of an input pane 260 that allows for the user to input preferences for settings 250. In the illustrated example, the settings 250 may include options for captions 252 and font size 254. Referring to FIG. 2C, when the user selects the options for captions ON, a captioning pane 270 may be rendered that is configured to generate a text rendering of spoken audio that is captured by the communicative session application.

Figure 3A:
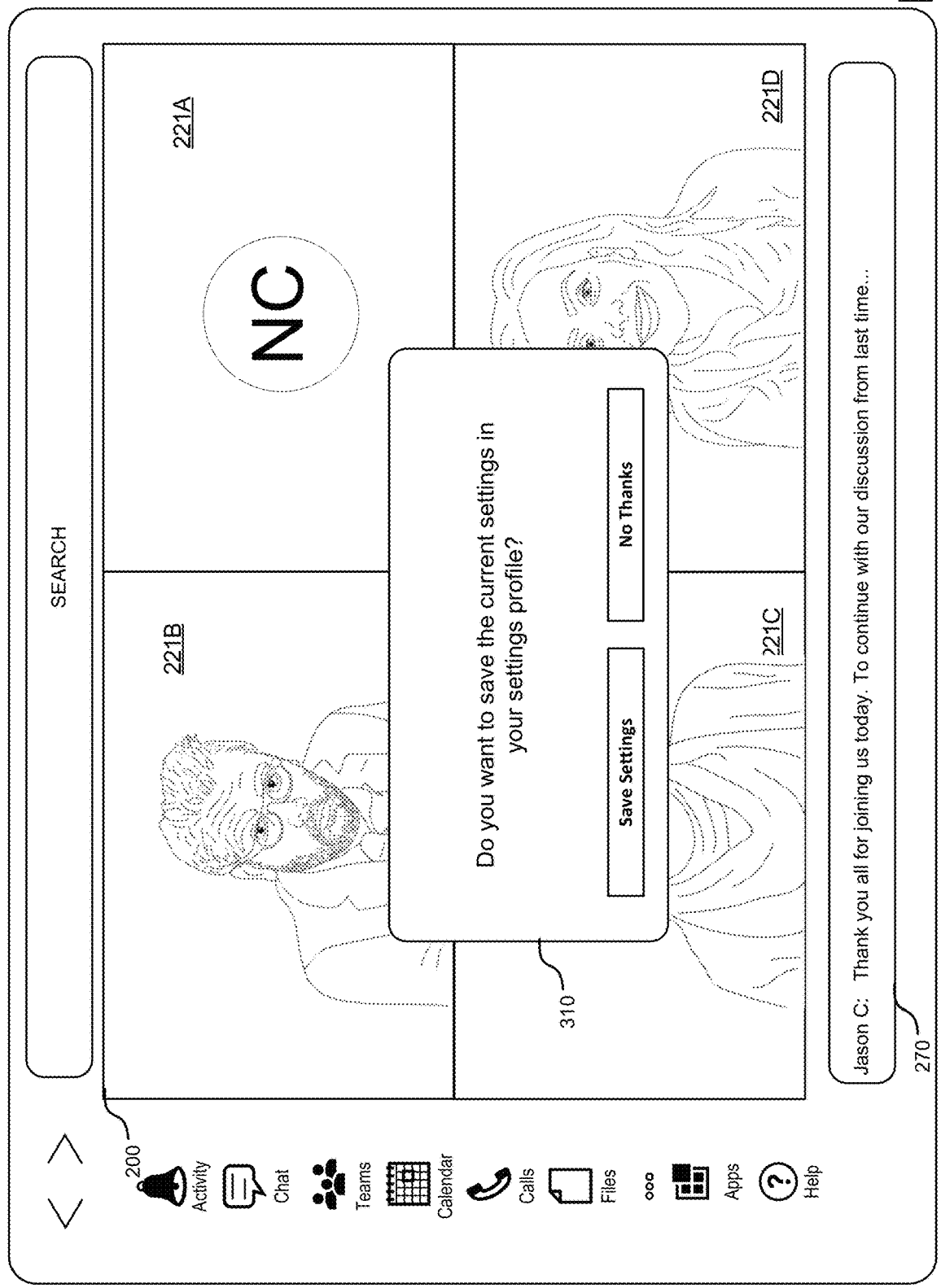
FIG. 3A illustrates an example user interface in accordance with an embodiment.

Turning to FIG. 3A, illustrated is an example user interface 200 showing a collaborative session including four participants 221A, 221B, 221C, and 221D. FIG. 3A illustrates generation of pop-up pane 310 that prompts the user as to whether the user's selected settings, for example the settings selected in FIG. 2B, should be saved. In an embodiment, the user's settings 250 may be saved in a settings profile that is associated with the user. In the illustrated example, the pop-up pane 310 may include options for accepting the settings into the user's settings profile, or declining the option.

Figure 3B:
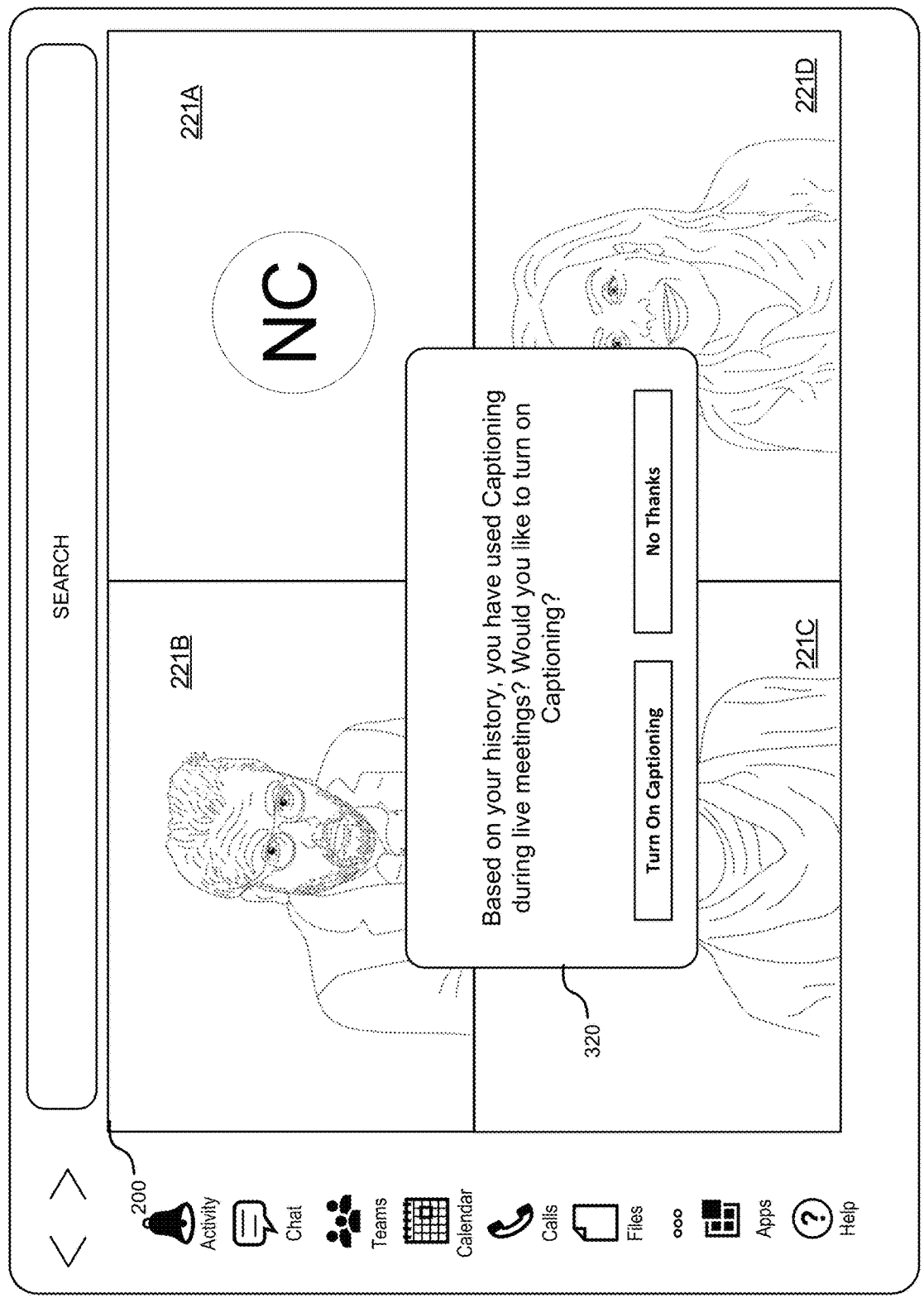
FIG. 3B illustrates an example user interface in accordance with an embodiment.

Turning to FIG. 3B, illustrated is an example user interface 200 showing a collaborative session including four participants 221A, 221B, 221C, and 221D. FIG. 3B illustrates generation of pop-up pane 320 that prompts the user as to whether the user wishes to turn on a feature such as captioning. The user may be prompted based on the user's past inputs for settings, for example if the user has previously selected captions during the collaborative session. In an embodiment, the user may be prompted based on a threshold such as the user having selected the setting at least X times in the past Y sessions. In the illustrated example, the pop-up pane 320 may include options for turning on the setting or declining the option.

Figure 3C:
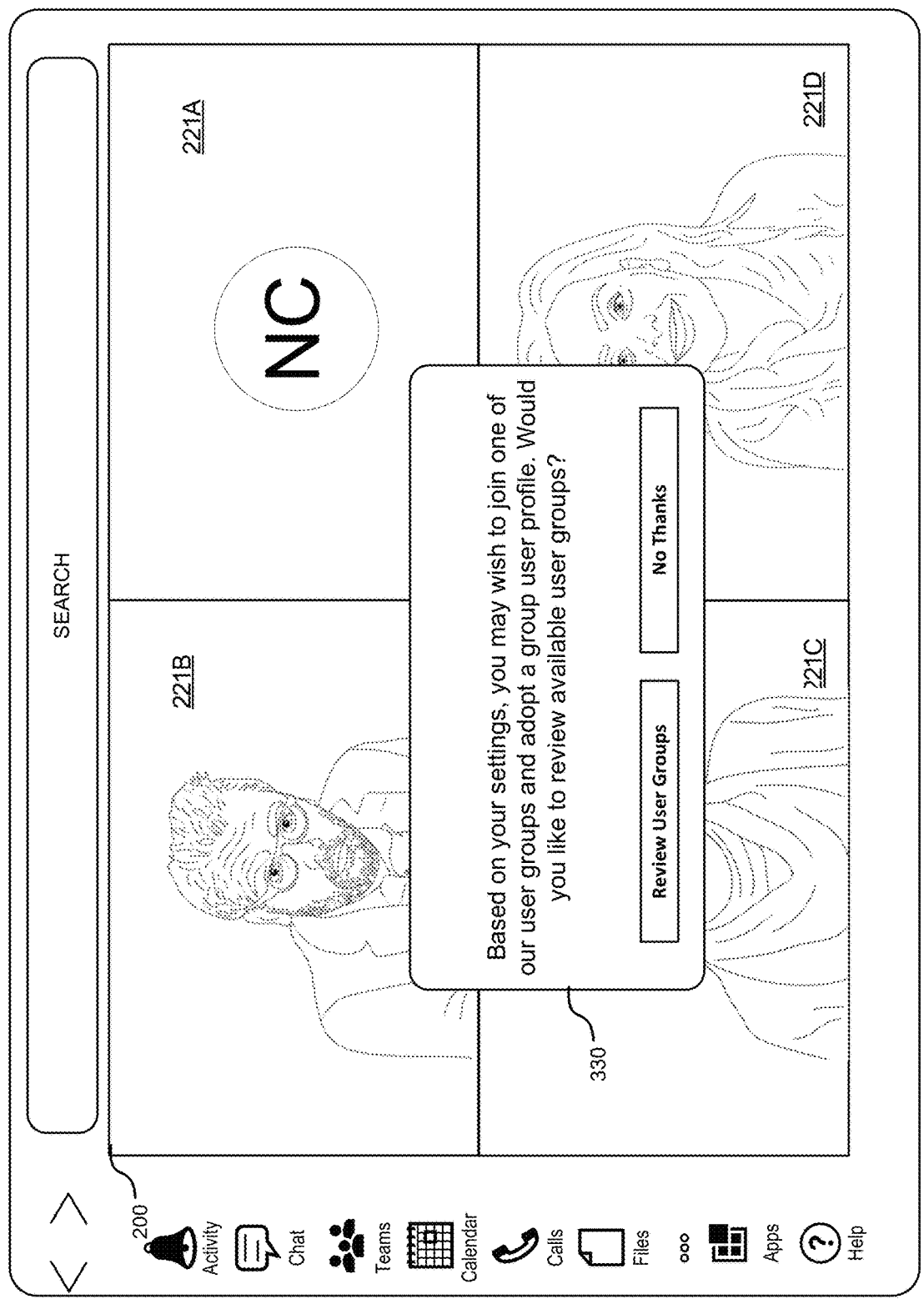
FIG. 3C illustrates an example user interface in accordance with an embodiment.

Turning to FIG. 3C, illustrated is an example user interface 200 showing a collaborative session including four participants 221A, 221B, 221C, and 221D. FIG. 3C illustrates generation of pop-up pane 330 that prompts the user as to whether the user wishes to review and opt into one or more user groups that have associated profiles for settings. The user may be prompted based on the user's past inputs for settings, for example if the user has previously selected captions during the collaborative session. In another example, the user may be prompted based on the user's identification as being associated with one or more of the user groups. In the illustrated example, the pop-up pane 330 may include options for reviewing the available user groups, or declining the option.

Figure 3D:
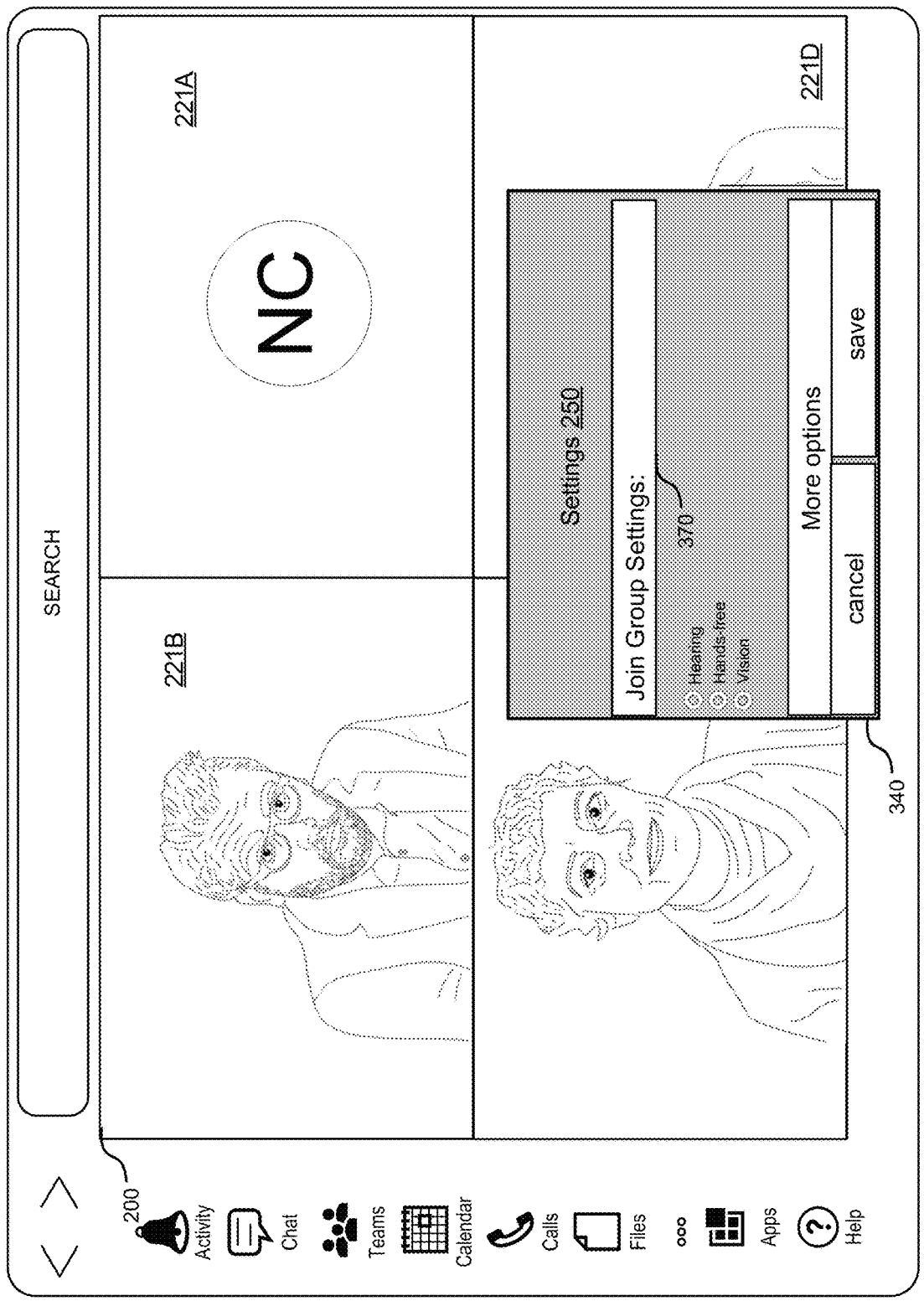
FIG. 3D illustrates an example user interface in accordance with an embodiment.

FIG. 3D illustrates generation of an input pane 340 that allows for the user to input preferences for settings 250. In the illustrated example, the settings 250 may include options for joining group settings 370. In an embodiment, when the user selects an option to join one or more available group settings, the user's profile may be updated to include settings associated with the selected user group.

Figure 3E:
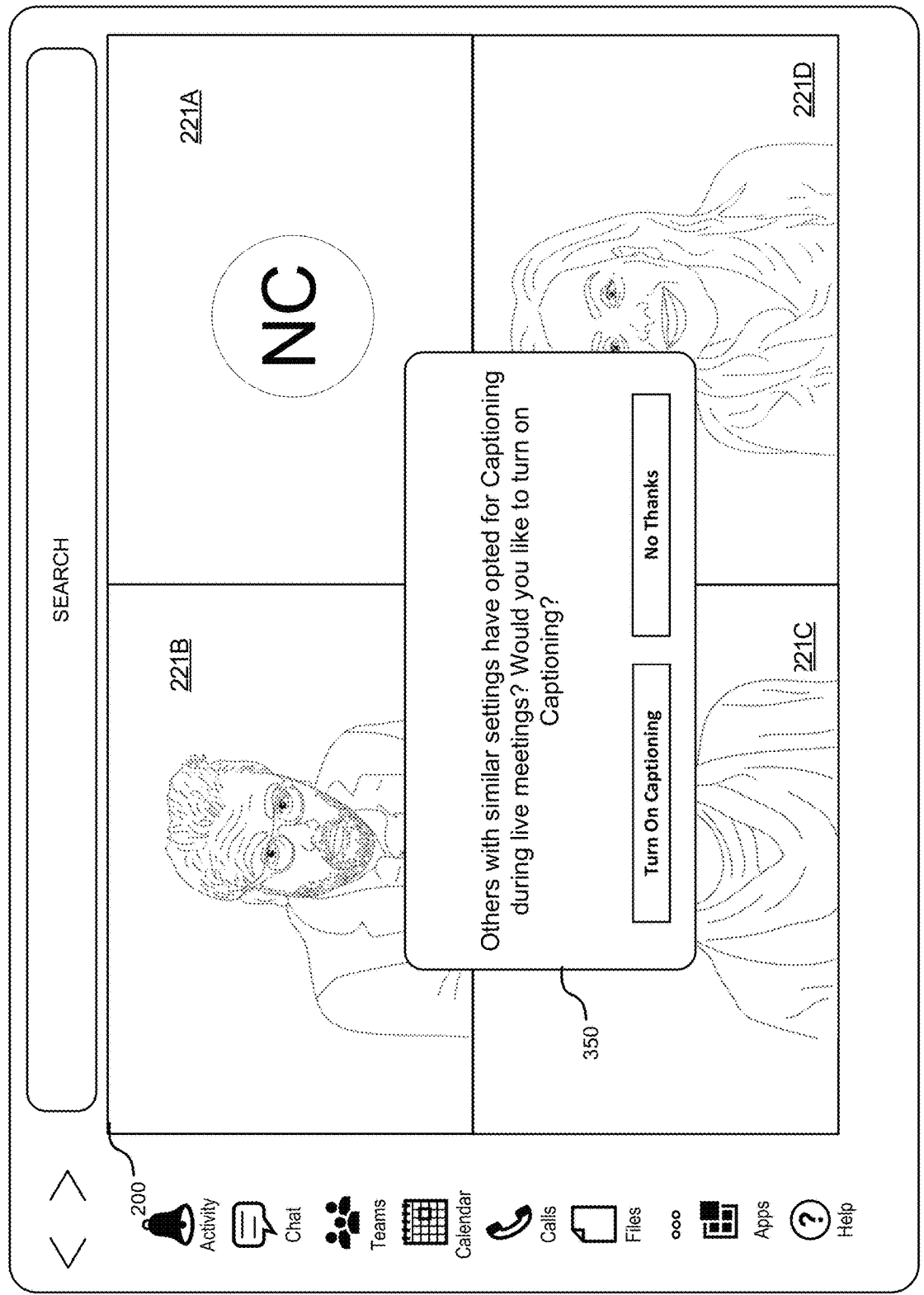
FIG. 3E illustrates an example user interface in accordance with an embodiment.

Turning to FIG. 3E, illustrated is an example user interface 200 showing a collaborative session including four participants 221A, 221B, 221C, and 221D. FIG. 3E illustrates generation of pop-up pane 350 that informs the user that other users who have activated similar settings have also activated the captioning setting, and prompts the user as to whether the user wishes to turn on a feature such as captioning. The user may be prompted based on the user's past inputs for settings, for example if the user has previously selected settings during the collaborative session that fall within a predetermined profile for a group of settings that are typically selected together. In an embodiment, the user may be prompted based on a threshold such as the user having selected X number of settings out of Y settings that have been identified as having a Z probability of being selected together. More generally, the user may be prompted based on a recommendation engine configured to generate suggestions for the user based on the user's selected settings. In the illustrated example, the pop-up pane 350 may include options for turning on the setting, or declining the option.

Figure 3F:
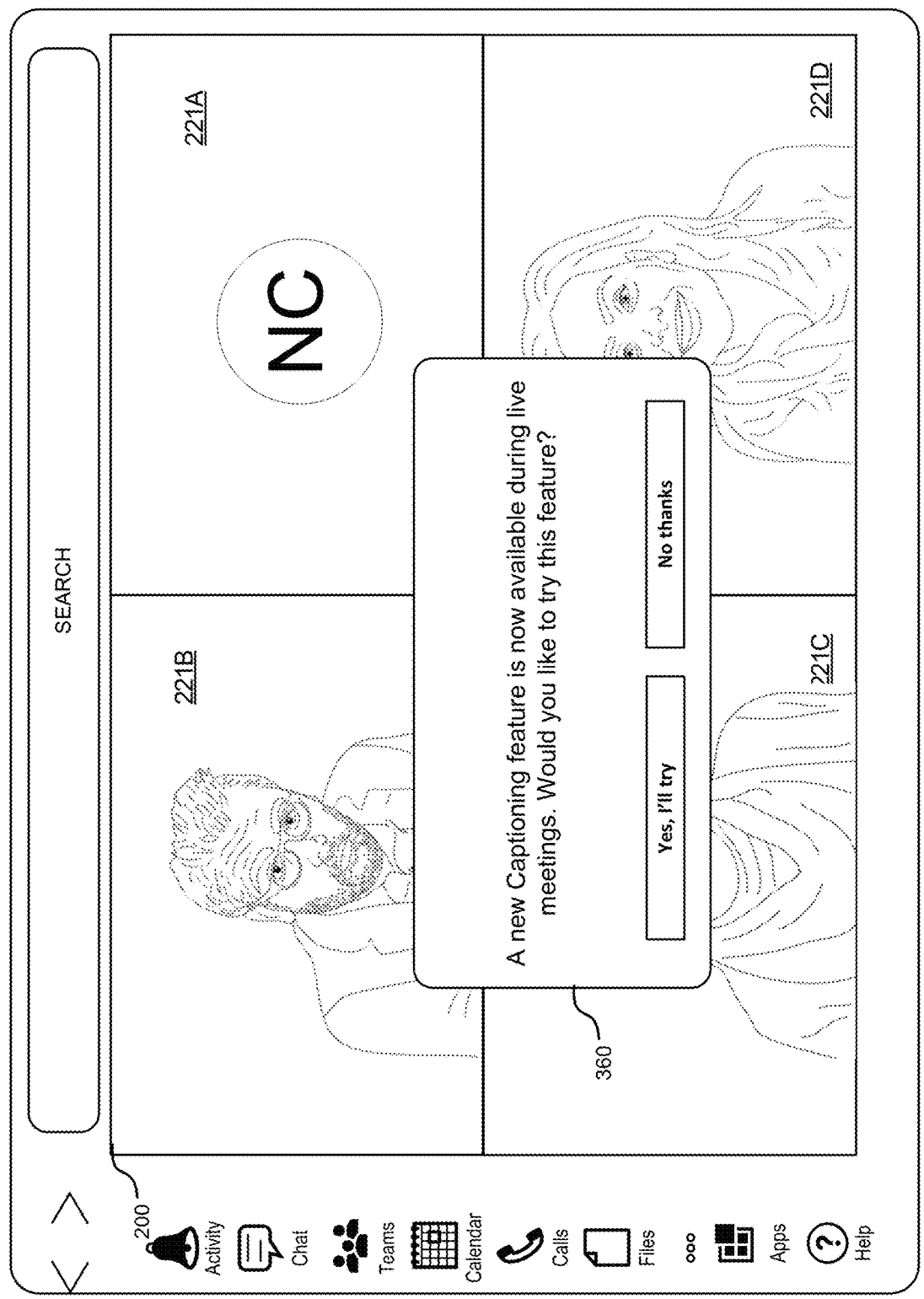
FIG. 3F illustrates an example user interface in accordance with an embodiment.

Turning to FIG. 3F, illustrated is an example user interface 200 showing a collaborative session including four participants 221A, 221B, 221C, and 221D. FIG. 3B illustrates generation of pop-up pane 360 that informs the user that a new setting is now available for activation during the collaborative session. The user may be prompted based on the user's past inputs for settings, for example if the user has previously selected settings during the collaborative session that fall within a predetermined profile for a group of settings that are related to the new setting. In an embodiment, the user may be prompted based on a threshold such as the user having selected X number of settings out of Y settings that have been identified as being related to the new feature. More generally, the user may be prompted based on a recommendation engine configured to generate suggestions for the user based on the user's selected settings. In the illustrated example, the pop-up pane 360 may include options for turning on the new setting, or declining the option.

Turning to FIG. 4, illustrated is an example user computing environment 400 that includes a monitor 410 with input device 412, laptop device 430, and smartphone 420. In one embodiment, a system such as that illustrated in FIG. 1 may detect how many devices that the user has connected in the computing environment and distribute features/settings across the multiple connected devices to provide an integrated user experience. In an embodiment, the system may distribute various features associated with the engagement automatically based on capabilities of each device. For example, a controller function for a collaborative session may be rendered on the smartphone 420, a live view of other users of the collaboration session may be rendered on the monitor 410, and a content view with active transcripts may be rendered on the laptop 430. The system may intelligently select features to be rendered on the devices based on capabilities of each device.

In one embodiment, a storage service may be provided that is configured to manage and store settings data. In some embodiments, settings data may be implemented using tables of data. In one implementation, the data may have columns such as ID, Title, User, and TimeDate. Each row of the table may be an instance of a setting. For example, if Bob Smith has settings including captions settings, font settings, and audio settings. The data for the three settings may be associated with the name Bob Smith, a timestamp of the time and date that the settings data were created, and each setting may have different unique IDs. FIG. 5 illustrates one example table 500 showing information pertaining to three settings, each setting having an ID which may conform to a globally unique identifier (GUID) scheme, a title for the setting which may be a text string, the user of the setting which may be a text string or some other identifier for a user, and a date/time that the setting was modified which can be in a date and time format. In some embodiments, each setting may be associated with one or more categories. Examples of categories may include accessibility settings, settings associated with an application or a type of application, settings associated with a particular device or accessory, and the like. The categories can allow for settings to be grouped into groupings or subsets of settings, which can further allow for flexibility in how settings and settings profiles can be stored and used across applications and systems.

In some embodiments, additional or different columns may be included. Examples of columns may include location, type, or purpose. Additionally, columns may contain a file such as an image, document fragment, or an XML/HTML file. In some embodiments, a weight may be associated with each setting that may indicate, for example, how often a user a user has selected the setting. In another example, the weight can be a predetermined value that may indicate the relative weight to be assigned to that setting based on importance, priority, system impact, user preference, or other factors.

Multiple applications or services may read or write the data for a setting, and allow for modifications to the schema of the data. The term "application" may refer to any application, website, add-in, SaaS service, etc. The storage service may receive information from one or more applications that are configured to receive user or system input pertaining to settings data. For example, inputs may be received via communications applications, collaboration applications, document editing applications, audio applications, video applications, etc.

The storage service may be remotely implemented such as on a server, or may be implemented on one or more devices. In some embodiments, the device providing the storage service may be separate from the device where the application is executing. The application may read and/or write data to the storage service over a network. In some implementations, the schema of the data may include a column containing a list of who has access rights. The access rights may indicate, for example, that only an authenticated user such as BobSmith@Contoso.com and FredJacoby@Contoso.com may access the data. APIs may also be exposed to allow programs to request or retrieve relevant settings data, such as those that the users have access to or are engaged with because of a shared task or project.

Settings data may be created and edited using any application that is capable of receiving user inputs and processing the inputs to generate or modify information pertaining to a setting. In an embodiment, the settings data may be saved using a relatively simple form in the storage service, even when modified using a more complex editing application.

Figure 6:
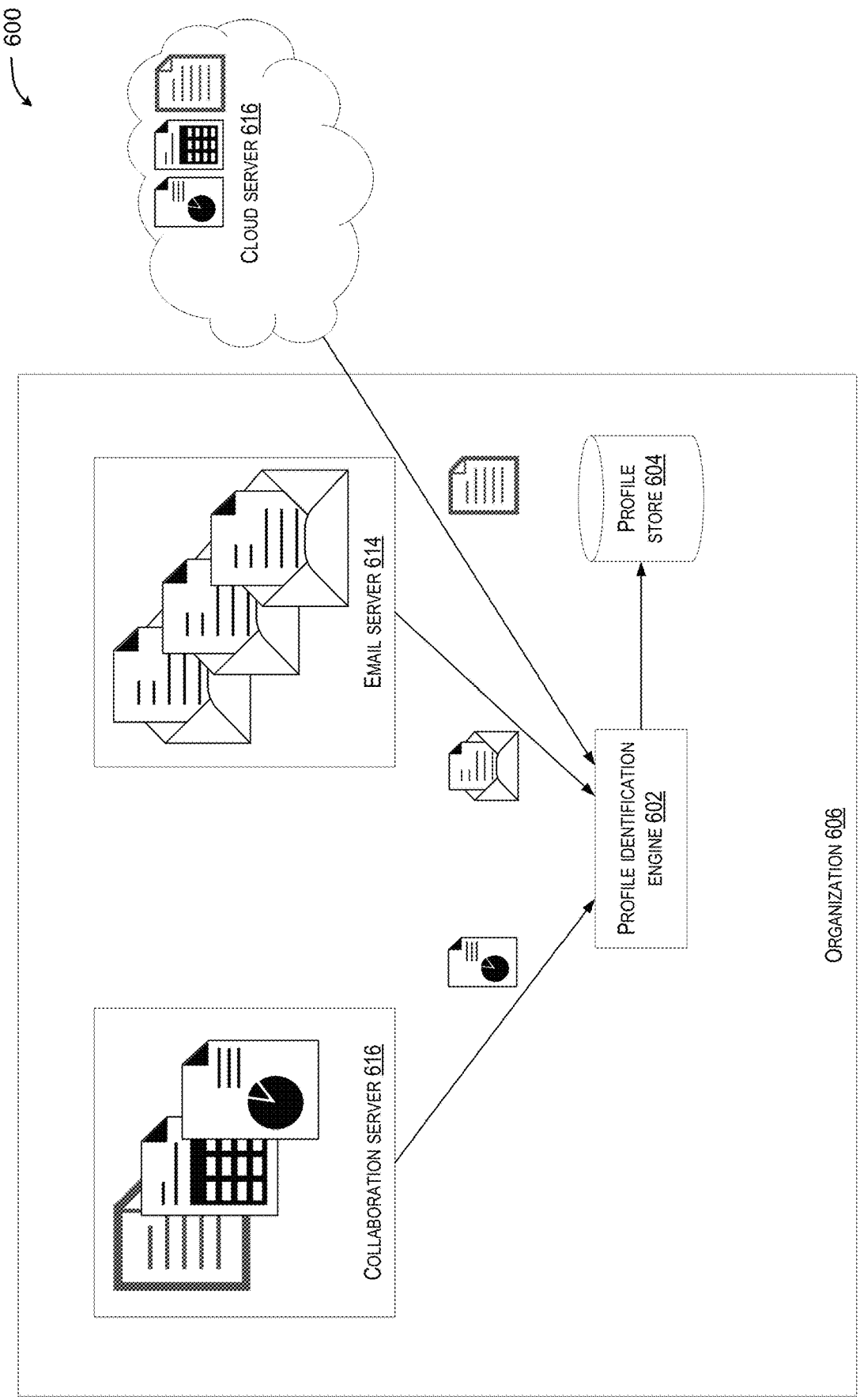
FIG. 6 illustrates a block diagram for identifying settings and providing them to applications.

FIG. 6 illustrates a block diagram 600 for generating, storing, and re-using settings profiles in conjunction with a team or organization 606. In some embodiments, profile identification engine 602 receives settings profiles to be processed from collaboration server 616, email server 614, cloud server 616, or the like. In some embodiments, the profiles stored on these servers may be associated with organization 606. This enables profiles to be identified that are particular to organization 606.

For example, collaboration server 616 may store slide presentations, spreadsheets, word processing documents, emails, calendar appointments, or the like. In some embodiments, chunk identification engine 602 may have access to retrieve the documents stored in collaboration server 616. Additionally or alternatively, collaboration server 616 may provide stored settings or profiles to profile identification engine 602. Profile identification engine 602 may also be implemented as an add-in executing within collaboration server 616.

Profile identification engine 602 may similarly receive settings or profiles from email server 614. These settings or profiles may pertain to emails, attachments, or any other type of document. In some embodiments, while cloud document server 616 exists physically outside of organization 606, the data contained thereon may still be considered part of the organization.

Figure 7:
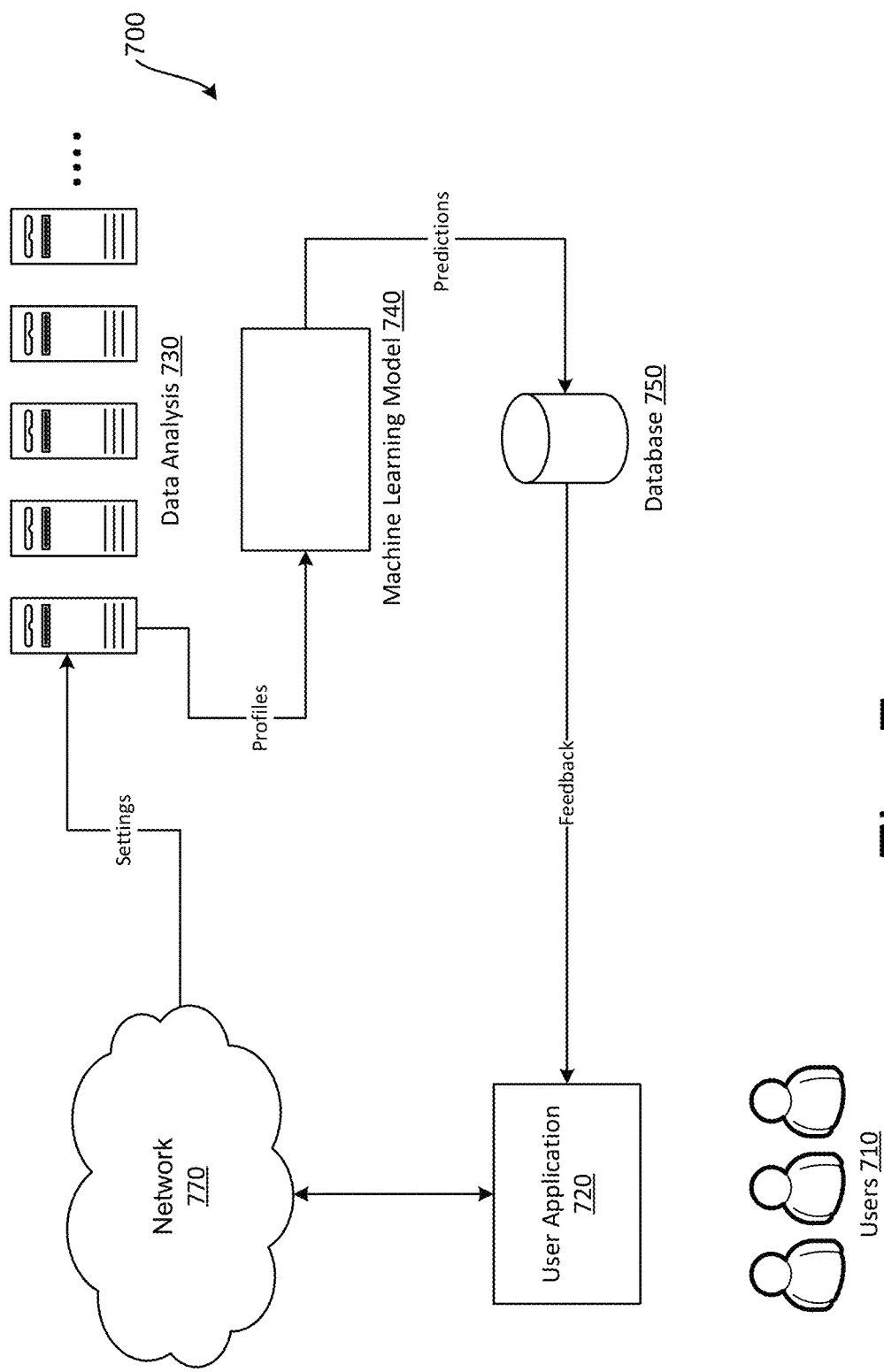
FIG. 7 illustrates aspects of a system for managing settings.

FIG. 7 is a computing system architecture diagram showing an overview of a system disclosed herein for a settings system, according to one embodiment disclosed herein. As shown in FIG. 7, an settings system 700 (which might also be referred to herein as an "user settings system" or as a "impairment settings system") may be configured to receive, store, send, and predict settings based upon various user data ("user data") generated by data analysis components 730 (which might be referred to individually as an "data analysis component 730" or collectively as the "data analysis components 730").

The data analysis components 730 may, for example, include, but are not limited to, physical computing devices such as server computers or other types of hosts, associated hardware components (e.g. memory and mass storage devices), and networking components (e.g. routers, switches, and cables). The data analysis components 730 can also include software, such as operating systems, applications, and containers, network services, virtual components, such as virtual disks, virtual networks, and virtual machines. The database 750 can include data, such as a database, or a database shard (i.e. a partition of a database). The feedback may be used to predict a user setting that is used to update the user application 720 that provided the updated information to various users 710.

In some configurations, a machine learning model 740 may be configured to utilize supervised and/or unsupervised machine learning technologies to predict polling frequencies. For example, the machine learning model 740 may utilize supervised machine learning techniques by training on tracking data that describes various user settings data as described herein. The machine learning model 740 may also, or alternately, utilize unsupervised machine learning techniques to predict settings including, but not limited to, a clustering-based model 310, a forecasting-based model 370, a smoothing-based model 330, or another type of unsupervised machine learning model.

In some embodiments, the user data may be analyzed to identify trends and patterns related to settings and determine which settings may influence user behavior and interaction, and in some cases, which settings may be related to an increased likelihood of user behavior such as increasing the likelihood of participating in a collaboration event such as a meeting. In one embodiment, the machine learning model 740 may incorporate a classification function that may be configured to determine which user data patterns and settings are relevant for a particular objective. The classification function may, for example, continuously learn which user data patterns and settings are relevant to various potential outcomes. In some embodiments, supervised learning may be incorporated where the machine learning model may classify observations made from various user inputs. The machine learning model may assign metadata to the observations. The metadata may be updated by the machine learning model to update relevance to the objectives of interest as new observations are made and assign tags to the new observations. The machine learning model may learn which observations are alike and assign metadata to identify these observations. The machine learning model may classify future observations into categories.

In some embodiments, an algorithm, such as a feature subset selection algorithm or an induction algorithm, may be implemented to define groupings or categories. Probabilistic approaches may also be incorporated. One or more estimation methods may be incorporated, such as a parametric classification technique. In various embodiments, the machine learning model may employ a combination of probabilistic and heuristic methods to guide and narrow the data that are analyzed.

In order to provide relevant results that are more likely to indicate outcomes for a particular observed pattern of data, the most relevant patterns may be identified and weighted. In some embodiments a heuristic model can be used to determine settings that provide an acceptable confidence level in the results. For example, experience-based techniques, such as expert modeling can be used to aid in the initial selection of parameters. The heuristic model can probabilistically indicate parameters of likely impact through, for example, tagging various metadata related to a particular pattern. Feedback from an initial round of analysis can be used to further refine the initial selection, thus implementing a closed loop system that generates likely candidates for settings in situations where programmatic approaches may be impractical or infeasible. As an example, Markov modeling or variations thereof (e.g., hidden Markov model and hierarchical hidden Markov model) can be used in some embodiments to identify candidate polling frequencies that may otherwise be missed using traditional methods.

As shown in FIG. 7, the machine learning model 740 can generate predictions (which might be referred to herein simply as a "prediction") based on features extracted from the user and settings information. The predictions can be provided in various forms, such as a single setting, or a schedule of settings that may change over time.

Figure 8:
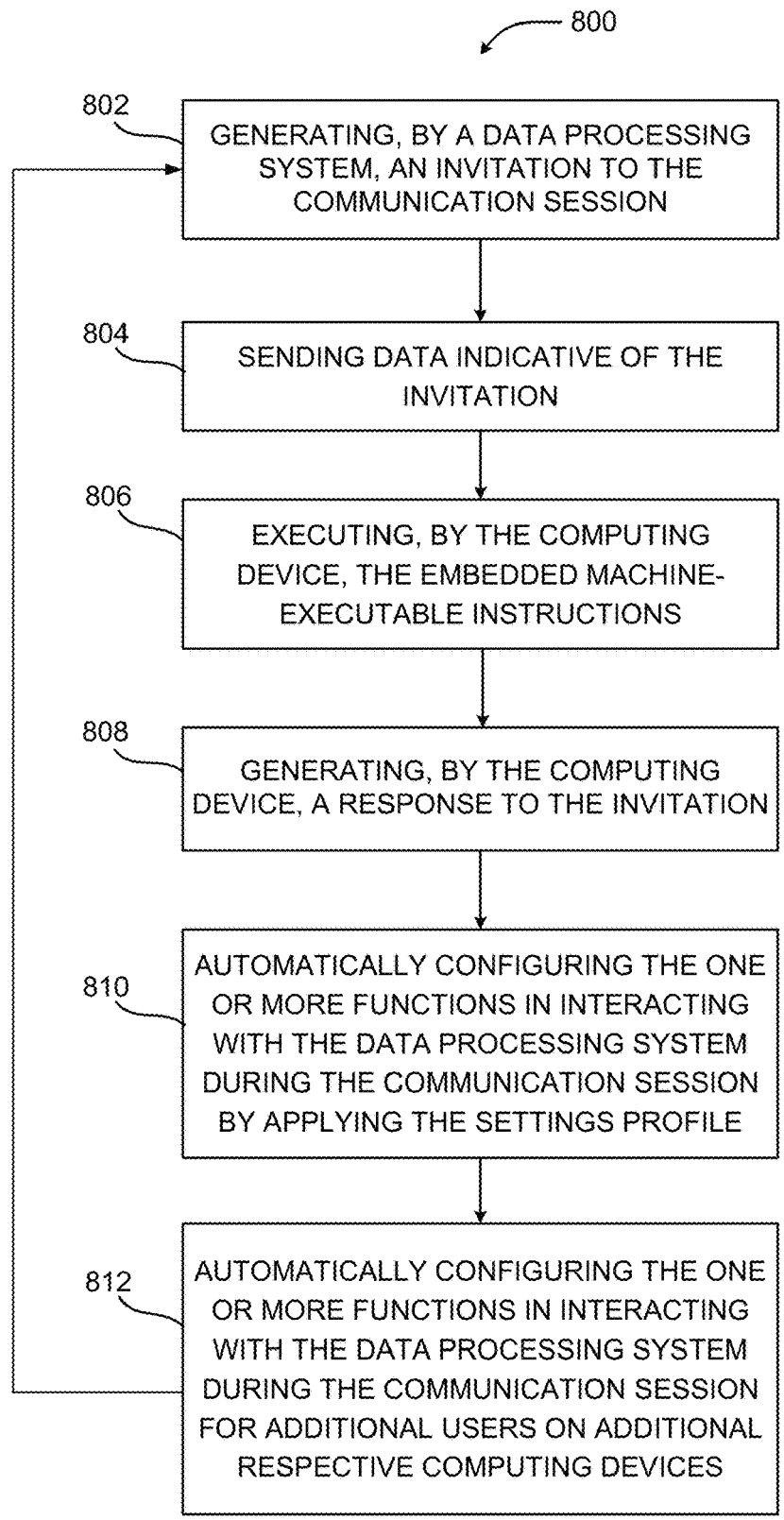
FIG. 8 illustrates a routine for managing settings according to one embodiment.

FIG. 8 is a flow diagram illustrating aspects of a routine 800 to be performed by a data processing system for managing settings. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 800 is described as running on a system 80, it can be appreciated that the routine 800 and other operations described herein can be executed on an individual computing device, e.g., computing device 84, or several devices.

Additionally, the operations illustrated in FIG. 8 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 800 begins at operation 802, which illustrates generating an invitation to the communication session. In an embodiment, the invitation includes a time for the communication session, a link to join the session, and embedded machine-executable instructions which, upon execution by a computing device corresponding to a user of the communication session, cause the device to collect settings from the computing device. In an embodiment, the settings are usable to configure one or more computer-implemented functions for assisting the user to interact with interfaces of the device during the communication session.

Operation 804 illustrates sending, to a computing device of a respective user, data indicative of the invitation to the communication session.

Operation 806 illustrates executing, by the computing device, the embedded machine-executable instructions. In an embodiment, the execution of the machine-executable instructions causes the computing device to fetch a settings profile of the respective user on the computing device. In an embodiment, the settings profile includes settings for one or more functions of one or more applications.

Operation 808 illustrates generating, by the computing device, a response to the invitation, the response including the settings profile. In an embodiment, the response is included in an RSVP to the invitation. In an embodiment, the RSVP comprises an indication that the respective user has accepted or rejected the invitation. In another embodiment, the response is sent when the computing device connects to the communication session.

Operation 810 illustrates automatically configuring the one or more functions in interacting with the data processing system during the communication session by applying the settings profile.

Operation 812 illustrates automatically configuring the one or more functions in interacting with the data processing system during the communication session for additional users on additional respective computing devices by applying received settings that are unique to the additional users.

Figure 9:
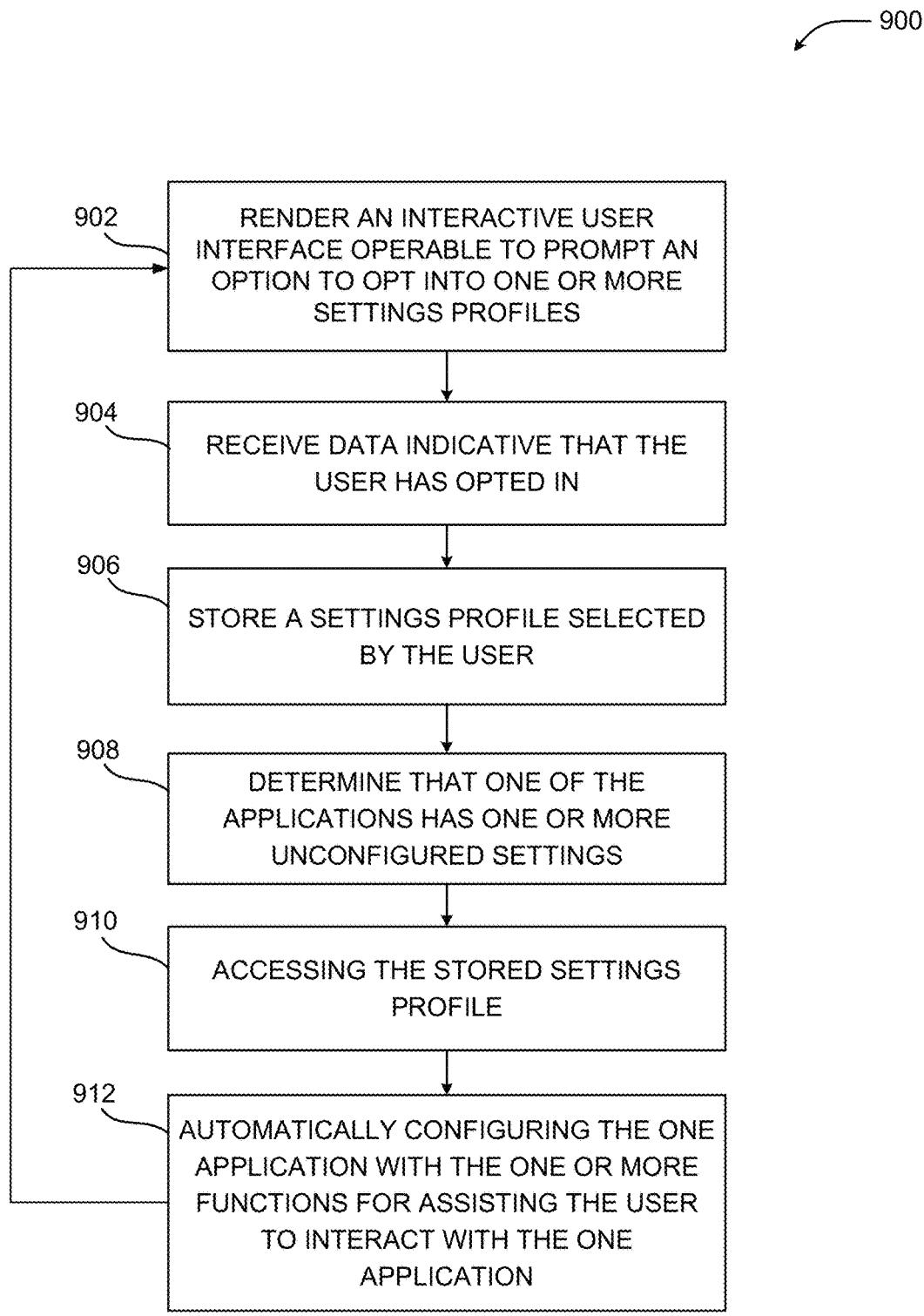
FIG. 9 illustrates a routine for managing settings according to one embodiment.

FIG. 9 is a flow diagram illustrating aspects of a routine 900 for managing settings.

The routine 900 begins at operation 902, where the system renders an interactive user interface operable to prompt an option to opt into one or more settings profiles. In an embodiment, the one or more settings profiles are usable to configure one or more functions for assisting a user to interact with one or more applications.

At operation 904, the system can store the one or more settings profiles.

At operation 906, the system can determine that a second application executing on the data processing system has one or more unconfigured settings.

At operation 908, the system can access the stored settings profile.

At operation 910, the system can, based on the stored settings profile, automatically configure the one or more unconfigured settings. In an embodiment, the one or more automatically configured settings configure one or more functions for assisting the user to interact with the data processing system during execution of the second application.

Figure 10:
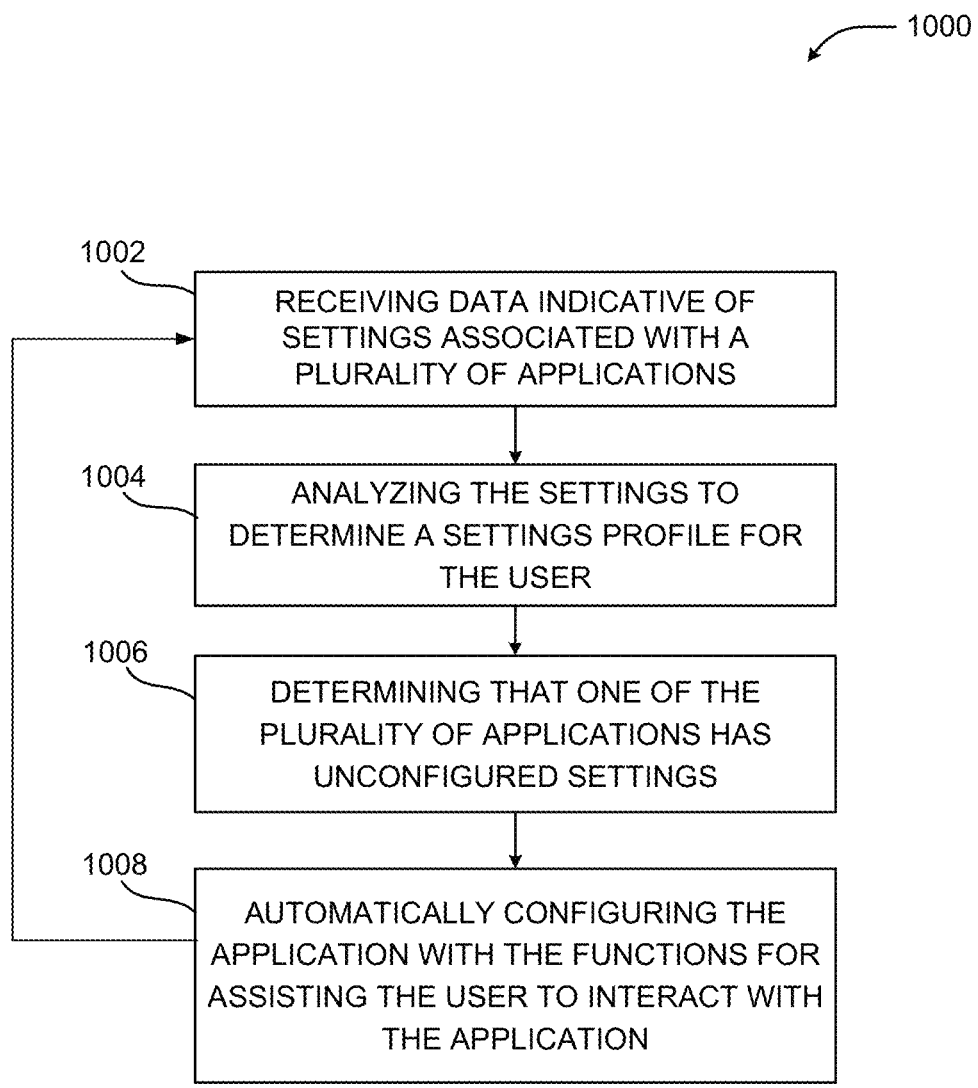
FIG. 10 illustrates a routine for managing settings according to one embodiment.

FIG. 10 is a flow diagram illustrating aspects of a routine 900 for managing settings.

The routine 1000 begins at operation 1002, where the system receives data indicative of settings associated with a plurality of applications executing on the system. In an embodiment, the settings are usable to configure one or more functions for assisting a user to interact with interactive applications.

At operation 1004, the system analyzes the settings to determine a settings profile for the user, the settings profile usable to configure a plurality of applications with the settings.

At operation 1006, the system can determine that one of the plurality of applications has one or more unconfigured settings.

At operation 1008, the system can, based on the settings profile, automatically configure the one application with the one or more functions for assisting the user to interact with the one application.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
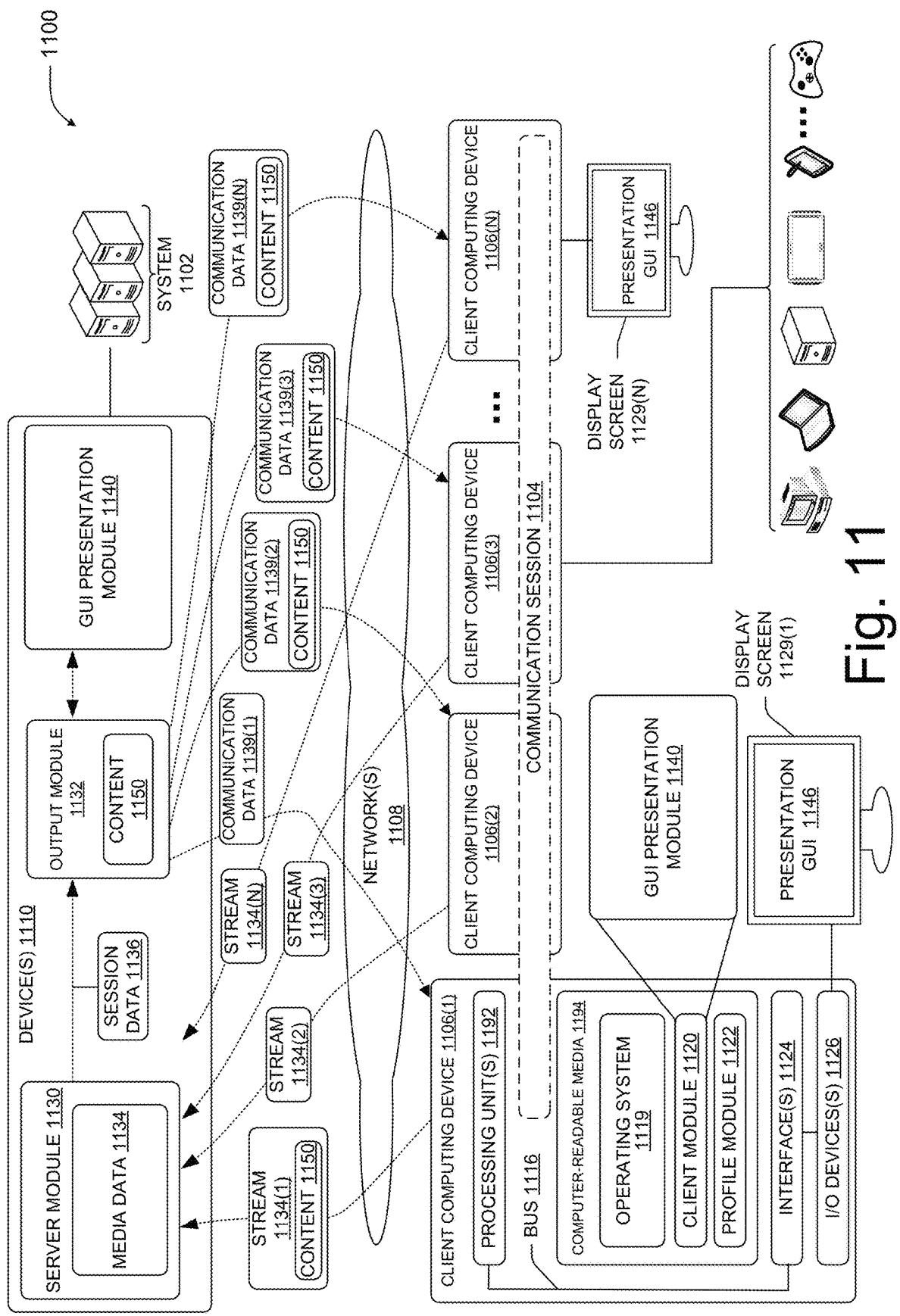
FIG. 11 is a computing system diagram showing aspects of an illustrative operating environment for the technologies disclosed herein.

FIG. 11 is a diagram illustrating an example environment 1100 in which a system 1102 can implement the techniques disclosed herein. In some implementations, a system 1102 may function to collect, analyze, and share content that is displayed to users of a communication session 1104. As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104. The client computing devices 1106 can correlate to the user computing devices 106 shown in FIG. 1. Although some examples show one of the computers 1106 processing aspects of the present techniques, it can be appreciated that the techniques disclosed herein can be applied to other computing devices and are not to be construed as limiting.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In the examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations. Each stream can also include text, audio and video data, such as the data communicated within a channel, chat board, or a private messaging service.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) (which are also referred to herein as computing devices 104A-104N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices (not shown in FIG. 11) to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1129(1)), which can display a UI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) (each of which are also referred to herein as a "data processing system") may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134(N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(3) participating in a live viewing of the communication session). The communication data 1139 may include video, audio, and/or other content data, provided by the output module 1132 based on content 1150 associated with the output module 1132 and based on received session data 1136.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 and/or the client module 1120 can include GUI presentation module 1140. The GUI presentation module 1140 may be configured to analyze communication data 1139 that is for delivery to one or more of the client computing devices 1106. Specifically, the GUI presentation module 1140, at the device(s) 1110 and/or the client computing device 1106, may analyze communication data 1139 to determine an appropriate manner for displaying video, image, and/or content on the display screen 1129(1) of an associated client computing device 1106. In some implementations, the GUI presentation module 1140 may provide video, image, and/or content to a presentation GUI 1146 rendered on the display screen 1129(1) of the associated client computing device 1106. The presentation GUI 1146 may be caused to be rendered on the display screen 1129(1) by the GUI presentation module 1140. The presentation GUI 1146 may include the video, image, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, and a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had while viewing the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 12:
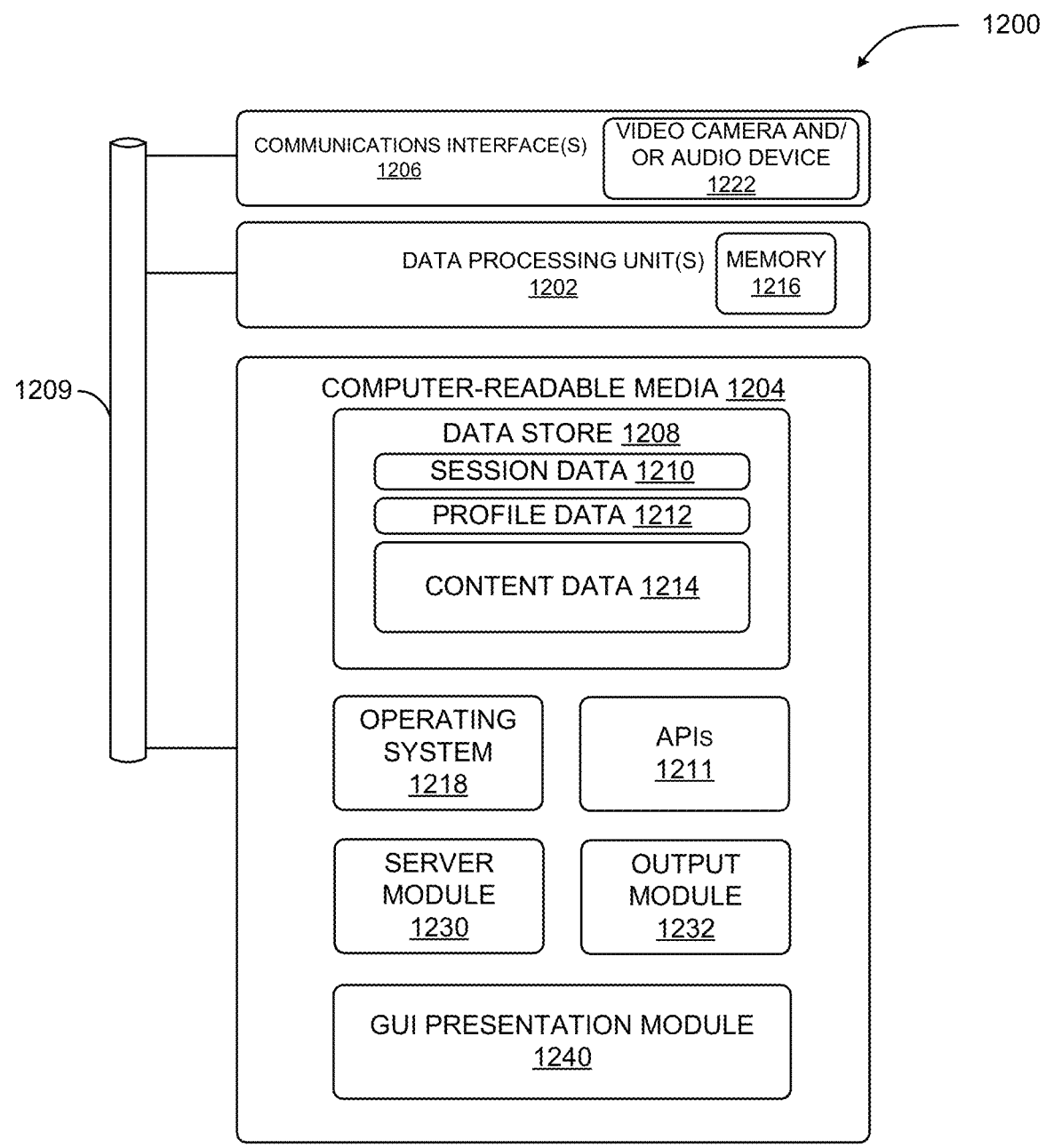
FIG. 12 is a computing architecture diagram showing aspects of the configuration and operation of a computing device that can implement aspects of the technologies disclosed herein.

FIG. 12 illustrates a diagram that shows example components of an example device 1200 (also referred to herein as a "computing device") configured to generate data for some of the user interfaces disclosed herein. The device 1200 may generate data that may include one or more sections that may render or comprise video, images, virtual objects, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") (not shown in FIG. 12) or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210 (e.g., session data 1136), profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1211 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The disclosure presented herein also encompasses the subject matter set forth in the following clauses:

Clause 1: A machine-implemented method for adaptively applying settings unique to users in a communication session, the method comprising:

generating, by a data processing system, an invitation to the communication session, the invitation including a time for the communication session, a link to join the session, and embedded machine-executable instructions which, upon execution by a computing device corresponding to a user of the communication session, cause the device to collect settings from the computing device, the settings usable to configure one or more computer-implemented functions for assisting the user to interact with interfaces of the device during the communication session;

sending, to a computing device of a respective user, data indicative of the invitation to the communication session;

executing, by the computing device, the embedded machine-executable instructions, wherein the execution of the machine-executable instructions causes the computing device to fetch a settings profile of the respective user on the computing device, the settings profile including settings for one or more functions of one or more applications;

generating, by the computing device, a response to the invitation, the response including the settings profile, wherein:

the response is included in an RSVP to the invitation, the RSVP comprising an indication that the respective user has accepted or rejected the invitation; or the response is sent when the computing device connects to the communication session;

automatically configuring the one or more functions in interacting with the data processing system during the communication session by applying the settings profile; and automatically configuring the one or more functions in interacting with the data processing system during the communication session for additional users on additional respective computing devices by applying received settings that are unique to the additional users.

Clause 2: The method of clause 1, wherein the invitation includes a link to respond to the invitation.

Clause 3: The method of clauses 1 or 2, further comprising: storing, by the data processing system, the settings profile;

determining that a second application executing on the data processing system has one or more unconfigured settings;

accessing the stored settings profile; and based on the stored settings profile, automatically configuring one or more functions for assisting the user to interact with the data processing system during execution of the second application.

Clause 4: The method of any of clauses 1-3, wherein the settings profile is received via a standard interface.

Clause 5: The method of any of clauses 1-4, wherein the standard interface comprises an application programming interface (API) configured to receive requests for the settings profile and send the settings profile to requesting applications or processes.

Clause 6: The method of any of clauses 1-5, wherein the settings profile for the respective user is usable to configure a plurality of applications with settings that are based on the settings profile.

Clause 7: The method of clauses 1-6, further comprising: storing the settings profile at a cloud-based storage; and enabling access to the stored settings profile to remote systems and devices.

Clause 8: The method of any of clauses 1-7, wherein the settings profile is obtained by an agent executing on the data processing system.

Clause 9: The method of any of clauses 1-8, wherein the settings profile is determined using machine learning.

Clause 10: The method of any of clauses 1-9 further comprising associating the settings profile as a portable user profile.

Clause 11: A system, comprising: one or more data processing units; and a computer-readable medium having encoded thereon computer-executable instructions to cause the one or more data processing units to: generating an invitation to a communication session, the invitation including a time for the communication session, a link to join the session, and embedded machine-executable instructions which, upon execution by a computing device corresponding to a user of the communication session, cause the device to collect settings from the computing device, the settings usable to configure one or more computer-implemented functions for assisting the user to interact with interfaces of the device during the communication session;

sending, to a computing device of a respective user, data indicative of the invitation to the communication session;

causing the computing device to execute the embedded machine-executable instructions, wherein the execution of the machine-executable instructions causes the computing device to fetch a settings profile of the respective user on the computing device, the settings profile including settings for one or more functions of one or more applications;

receiving, from the computing device, a response to the invitation, the response including the settings profile, wherein:
the response is included in an RSVP to the invitation, the RSVP comprising an indication that the respective user has accepted or rejected the invitation; or
the response is sent when the computing device connects to the communication session;
automatically configuring the one or more functions in interacting with the system during the communication session by applying the settings profile; and
automatically configuring the one or more functions in interacting with the system during the communication session for additional users on additional respective computing devices by applying received settings that are unique to the additional users.

Clause 12: The system of clause 11, wherein the settings profile is role-based.

Clause 13: The system of clauses 11 and 12, wherein each of a plurality of roles is associated with a settings profile specific to characteristics of each role.

Clause 14: The system of any clauses 11-13, further comprising computer-executable instructions to cause the one or more data processing units to determine, based on a context of the user, that the user should be prompted as to whether the settings profile should be applied to other applications.

Clause 15: The system of any clauses 11-14, wherein the determination is based on usage and monitoring of the user's selections.

Clause 16: A system, comprising: means for generating, by a data processing system, an invitation to a communication session, the invitation including a time for the communication session, a link to join the session, and embedded machine-executable instructions which, upon execution by a computing device corresponding to a user of the communication session, cause the device to collect settings from the computing device, the settings usable to configure one or more computer-implemented functions for assisting the user to interact with interfaces of the device during the communication session;
means for sending, to a computing device of a respective user, data indicative of the invitation to the communication session;
means for causing the computing device to execute the embedded machine-executable instructions, wherein the execution of the machine-executable instructions causes the computing device to fetch a settings profile of the respective user on the computing device, the settings profile including settings for one or more functions of one or more applications;
means for receiving, from the computing device, a response to the invitation, the response including the settings profile, wherein:
the response is included in an RSVP to the invitation, the RSVP comprising an indication that the respective user has accepted or rejected the invitation; or
the response is sent when the computing device connects to the communication session;
means for automatically configuring the one or more functions in interacting with the system during the communication session by applying the settings profile; and
means for automatically configuring the one or more functions in interacting with the system during the communication session for additional users on additional respective computing devices by applying received settings that are unique to the additional users.

Clause 17: The system of clause 16, wherein the settings profile is determined using machine learning.

Clause 18: The system of any of clauses 16 and 17, further comprising: means for storing the settings profile at a cloud-based storage; and
means for enabling access to the stored settings profile to remote systems and devices.

Clause 19: The system of any of the clauses 16-18, wherein the settings profile is further determined based on usage and monitoring of the user's selections.

Clause 20: The system of any of the clauses 16-19, wherein the settings profile is role-based and each of a plurality of roles is associated with a settings profile specific to characteristics of each role.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A machine-implemented method for adaptively applying settings unique to users in a communication session, the method comprising:
generating, by a data processing system, an invitation to the communication session, the invitation including:
a time for the communication session,
a link to join the session, and
embedded machine-executable instructions which, upon execution by a computing device corresponding to a user of the communication session, cause the computing device to automatically collect settings usable to configure one or more computer-implemented functions for interacting with the computing device during the communication session;
sending, by the data processing system to the computing device of a respective user, data indicative of the invitation to the communication session;
receiving, by the data processing system from the computing device in response to execution of the embedded machine-executable instructions in the invitation by the computing device, a response to the invitation, the response including the settings, wherein:
the response is included in an RSVP to the invitation, the RSVP comprising an indication that the respective user has accepted or rejected the invitation; or
the response is sent when the computing device connects to the communication session;
automatically configuring, by the data processing system, the one or more functions in interacting with the computing device during the communication session by applying the settings; and
automatically configuring, by the data processing system, the one or more functions in interacting with additional respective computing devices during the communication session for additional users on the additional respective computing devices by applying received settings that are unique to the additional users.

2. The method of claim 1, wherein the invitation includes a link to respond to the invitation.

3. The method of claim 1, further comprising:
storing, by the data processing system, the settings;
determining that a second application executing on the data processing system has one or more unconfigured settings;
accessing the stored settings; and
based on the stored settings, automatically configuring one or more functions for assisting the user to interact with the computing device during execution of the second application.

4. The method of claim 1, wherein the settings are received via a standard interface.

5. The method of claim 4, wherein the standard interface comprises an application programming interface (API) configured to receive requests for the settings and send the settings to requesting applications or processes.

6. The method of claim 1, wherein the settings for the respective user is usable to configure a plurality of applications based on the settings.

7. The method of claim 6, further comprising:
storing the settings at a cloud-based storage; and
enabling access to the stored settings to remote systems and devices.

8. The method of claim 1, wherein the settings is obtained by an agent executing on the data processing system.

9. The method of claim 7, wherein the settings are determined using machine learning.

10. The method of claim 7, further comprising associating the settings as a portable user profile.

11. A system, comprising:
one or more data processing units; and
a computer-readable medium having encoded thereon computer-executable instructions to cause the one or more data processing units to perform operations comprising:
generating an invitation to a communication session, the invitation including a time for the communication session, a link to join the session, and embedded machine-executable instructions which, upon execution by a computing device corresponding to a user of the communication session, cause the computing device to collect settings usable to configure one or more computer-implemented functions for interacting with the computing device during the communication session;
sending, to the computing device, data indicative of the invitation to the communication session;
receiving, from the computing device in response to execution of the embedded machine-executable instructions in the invitation by the computing device, a response to the invitation, the response including the settings, wherein:
the response is included in an RSVP to the invitation, the RSVP comprising an indication that the respective user has accepted or rejected the invitation; or
the response is sent when the computing device connects to the communication session;
automatically configuring the one or more functions during the communication session by applying the settings; and
automatically configuring the one or more functions during the communication session for additional users on additional respective computing devices by applying received settings that are unique to the additional users.

12. The system of claim 11, wherein the settings is are role-based.

13. The system of claim 12, wherein each of a plurality of roles is associated with settings specific to characteristics of each role.

14. The system of claim 11, further comprising computer-executable instructions to cause the one or more data processing units to determine, based on a context of the user, that the user should be prompted as to whether the settings should be applied to other applications.

15. The system of claim 14, wherein the determination is based on usage and monitoring of the user's selections.

16. A system, comprising:
means for generating, by a data processing system, an invitation to a communication session, the invitation including a time for the communication session, a link to join the session, and embedded machine-executable instructions which, upon execution by a computing device corresponding to a user of the communication session, cause the computing device to automatically collect settings usable to configure one or more computer-implemented functions for interacting with the computing device during the communication session;
means for sending, to the computing device, data indicative of the invitation to the communication session;
means for receiving, from the computing device in response to execution of the embedded machine-executable instructions in the invitation by the computing device, a response to the invitation, the response including the settings, wherein:
the response is included in an RSVP to the invitation, the RSVP comprising an indication that the respective user has accepted or rejected the invitation; or
the response is sent when the computing device connects to the communication session;
means for automatically configuring the one or more functions during the communication session by applying the settings profile; and
means for automatically configuring the one or more functions during the communication session for additional users on additional respective computing devices by applying received settings that are unique to the additional users.

17. The system of claim 16, wherein the settings are determined using machine learning.

18. The system of claim 16, further comprising:
means for storing the settings at a cloud-based storage; and
means for enabling access to the stored settings to remote systems and devices.

19. The system of claim 16, wherein the settings are further determined based on usage and monitoring of the user's selections.

20. The system of claim 16, wherein the settings are role-based and each of a plurality of roles is associated with a settings profile specific to characteristics of each role.

* * * * *